(12) United States Patent
Adachi

(10) Patent No.: US 11,458,818 B2
(45) Date of Patent: Oct. 4, 2022

(54) WINDOW GLASS ANTI-FOGGING STRUCTURE, ELECTRIC POWER SUPPLY CONTROL APPARATUS OF WINDOW GLASS ANTI-FOGGING STRUCTURE, AND VEHICLE-INSTALLED CAMERA APPARATUS WITH WINDOW GLASS ANTI-FOGGING STRUCTURE

(71) Applicant: Toyota Jidosha Kabushiki Kaisha, Toyota Aichi-ken (JP)

(72) Inventor: Takahiro Adachi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 552 days.

(21) Appl. No.: 16/546,813

(22) Filed: Aug. 21, 2019

(65) Prior Publication Data
US 2020/0062085 A1 Feb. 27, 2020

(30) Foreign Application Priority Data
Aug. 23, 2018 (JP) .............................. JP2018-155953

(51) Int. Cl.
| B60J 1/02 | (2006.01) |
| G01K 1/02 | (2021.01) |
| B60J 1/00 | (2006.01) |
| B60S 1/02 | (2006.01) |
| B60R 16/023 | (2006.01) |
| H05B 1/02 | (2006.01) |
| B60R 11/04 | (2006.01) |
| B60J 1/08 | (2006.01) |

(Continued)

(52) U.S. Cl.
CPC ................ *B60J 1/002* (2013.01); *B60R 11/04* (2013.01); *B60R 16/023* (2013.01); *B60S 1/02* (2013.01); *G01K 1/026* (2013.01); *H05B 1/0236* (2013.01); *B60J 1/02* (2013.01); *B60J 1/08* (2013.01); *B60J 1/18* (2013.01); *B60R 2011/0026* (2013.01); *H05B 3/84* (2013.01); *H05B 2203/014* (2013.01)

(58) Field of Classification Search
CPC ........ B60J 1/002; B60R 11/04; B60R 16/023; G01K 1/026
See application file for complete search history.

(56) References Cited

U.S. PATENT DOCUMENTS 3,968,342 A * 7/1976 Inaba .................... G01N 27/121
219/203
2009/0206068 A1 * 8/2009 Ishizeki ............. B32B 17/10385
219/203

(Continued)

FOREIGN PATENT DOCUMENTS

| JP | 2004-210153 A | 7/2004 |
| JP | 2005-088724 A | 4/2005 |

(Continued)

*Primary Examiner* — Dennis H Pedder
(74) *Attorney, Agent, or Firm* — Dinsmore & Shohl LLP

(57) ABSTRACT

A window glass anti-fogging structure includes an anti-fogging membrane and a heater. The structure is provided on a view-angle glass surface of a window glass of a vehicle such that the structure covers the view-angle glass surface. The view-angle glass surface is a part of an inner surface of the window glass within a range of an angle of view of a vehicle-installed camera provided in a vehicle interior space for taking images of a view outside of the vehicle through the view-angle glass surface.

10 Claims, 18 Drawing Sheets

(51) Int. Cl.
*B60J 1/18* (2006.01)
*H05B 3/84* (2006.01)
*B60R 11/00* (2006.01)

(56) References Cited

U.S. PATENT DOCUMENTS

| | | |
|---|---|---|
| 2013/0226380 A1 | 8/2013 | Ando et al. |
| 2017/0106721 A1* | 4/2017 | Hoke .................. B60H 1/0073 |
| 2019/0184940 A1 | 6/2019 | Moon |

FOREIGN PATENT DOCUMENTS

| | | | |
|---|---|---|---|
| JP | 2008239018 A | 10/2008 | |
| JP | 2013-173402 A | 9/2013 | |
| JP | 2013177026 A | 9/2013 | |
| JP | 2014-101004 A | 6/2014 | |
| JP | 2014-129067 A | 7/2014 | |
| JP | 2017-071544 A | 4/2017 | |
| JP | 2017-212148 A | 11/2017 | |
| JP | 2017206080 A | 11/2017 | |
| JP | 2017-216193 A | 12/2017 | |
| JP | 2018-020771 A | 2/2018 | |
| WO | 2016129699 A1 | 8/2016 | |
| WO | 2017065114 A1 | 4/2017 | |
| WO | 2018043827 A1 | 3/2018 | |

* cited by examiner

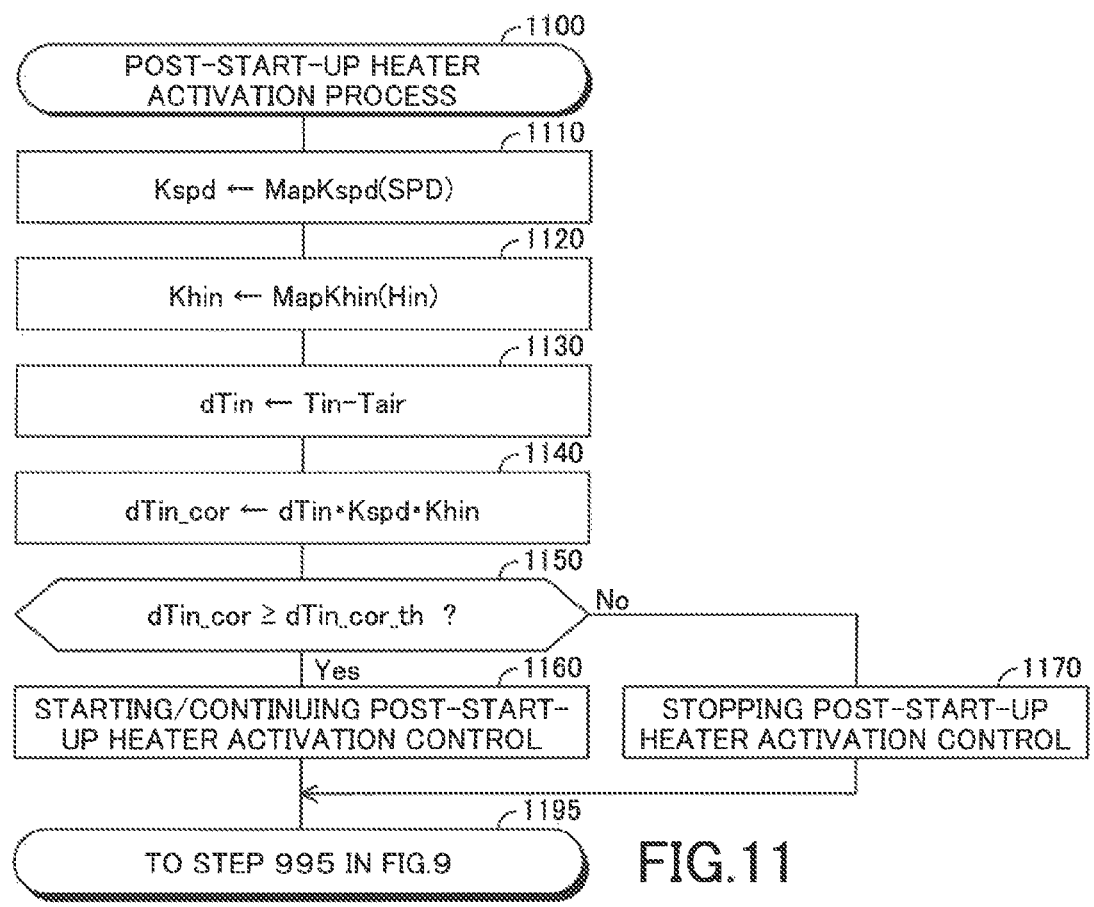

WINDOW GLASS ANTI-FOGGING STRUCTURE, ELECTRIC POWER SUPPLY CONTROL APPARATUS OF WINDOW GLASS ANTI-FOGGING STRUCTURE, AND VEHICLE-INSTALLED CAMERA APPARATUS WITH WINDOW GLASS ANTI-FOGGING STRUCTURE

CROSS-REFERENCE TO RELATED APPLICATIONS

This application claims priority to Japanese Patent Application No. 2018-155953 filed Aug. 23, 2018, which is incorporated herein by reference in its entirety.

BACKGROUND

Field

The present disclosure relates to a window glass anti-fogging structure for preventing a window glass of a vehicle from clouding, an electric power supply control apparatus for controlling a supply of an electric power to the window glass anti-fogging structure, and a vehicle-installed camera apparatus with the window glass anti-fogging structure.

Description of the Related Art

There has been developed a vehicle moving support system for executing an automatically vehicle stop control, etc. for braking a vehicle automatically to stop the vehicle before the vehicle collides with a person moving into a road in front of the vehicle from a side of the road. The vehicle moving support system is configured to detect the person, etc. in front of the vehicle on the basis of data of images taken by a vehicle-installed camera for taking images of a view in front of the vehicle through a front glass from a vehicle interior space of the vehicle. When the vehicle moving support system detects the person, etc. in front of the vehicle, the vehicle moving support system brakes the vehicle automatically to stop the vehicle to prevent the vehicle from colliding with the detected person, etc. without an operation of a brake pedal by a driver of the vehicle.

In the vehicle provided with the vehicle moving support system, the vehicle-installed camera cannot take the image of the view in front of the vehicle appropriately when a surface of the front glass within a range of an angle of view of the vehicle-installed camera, clouds. In this case, the vehicle moving support system cannot execute the automatically vehicle stop control, etc. appropriately. Accordingly, there is known a vehicle-installed camera apparatus provided with electric heating wires at an area where a bracket, to which the vehicle-installed camera is secured, is mounted on the front glass of the vehicle (for example, see JP 2017-206080 A). This vehicle-installed camera apparatus can heat the surface of the front glass within the range of the view-angle of the vehicle-installed camera by supplying electric power to the electric heating wires. Thereby, the surface of the front glass within the range of the view-angle of the vehicle-installed camera, can be prevented from clouding. Hereinafter, the surface of the front glass within the range of the view-angle of the vehicle-installed camera, will be referred to as "the view-angle glass surface".

The above-mentioned vehicle-installed camera apparatus needs to continue to supply the electric power to the electric heating wires for preventing the view-angle glass surface from clouding when the view-angle glass surface may cloud. Therefore, the vehicle-installed camera apparatus needs to continue to supply the electric power to the electric heating wires for a long time for preventing the view-angle glass surface from clouding when the view-angle glass surface is likely to cloud, for example, in a season that the atmospheric temperature is low, in particular, in winter.

Vehicles such as a so-called hybrid vehicle, a so-called plug-in hybrid vehicle, a so-called electric vehicle, etc., each of which has an electric motor as a vehicle driving force source, have been developed. In these vehicles, the electric power stored in a battery is used for driving the electric motor. In this regard, an amount of the electric power stored in the battery, is limited. Therefore, if the electric power is supplied to the electric heating wires from the battery for a long time for preventing the view-angle glass surface from clouding, an amount of the electric power available for driving the electric motor, may be reduced.

SUMMARY

The present disclosure has been made for solving the above-mentioned problem. An object of the present disclosure is to provide a window glass anti-fogging structure which can reduce the amount of the electric power consumed. Another object of the present disclosure is to provide an electric power supply control apparatus for controlling a supply of the electric power to the window glass anti-fogging structure according to the present disclosure. Further another object of the present disclosure is to provide a vehicle-installed camera apparatus provided with the window glass anti-fogging structure according to the present disclosure.

A window glass anti-fogging structure (20) according to the first embodiment is provided on an inner surface (101in) of a window glass (101) of a vehicle (100) for preventing the inner surface (101in) of the window glass (101) from clouding. The inner surface (101in) of the window glass (101) is a surface of the window glass (101) on the side of the vehicle interior space (105).

The window glass anti-fogging structure (20) is provided on a view-angle glass surface (101A) of the window glass (101) such that the window glass anti-fogging structure (20) covers the view-angle glass surface (101A). The view-angle glass surface (101A) is a part of the inner surface (101in) of the window glass (101) within a range of an angle (A) of view of a vehicle-installed camera (11) provided in the vehicle interior space (105) for taking images of a view outside of the vehicle (100) through the view-angle glass surface (101A).

The window glass anti-fogging structure (20) includes an anti-fogging membrane (24) having an anti-fogging property and a heater (23) for generating heat. The anti-fogging membrane (24) includes an inner surface (24in) and an outer surface (24out). The inner surface (24in) of the anti-fogging membrane (24) is a surface of the anti-fogging membrane (24) on the side of the vehicle interior space (105) in the condition that the window glass anti-fogging structure (20) is provided on the view-angle glass surface (101A). The outer surface (24out) of the anti-fogging membrane (24) is a surface of the anti-fogging membrane (24) on the opposite side of the inner surface (24in) of the anti-fogging membrane (24). The inner surface (24in) of the anti-fogging membrane (24) exposes to the vehicle interior space (105) on the condition that the window glass anti-fogging structure (20) is provided on the view-angle glass surface (101A). The heater (23) includes at least one electric heating wire (22)

which generates the heat when electric power is supplied to the at least one electric heating wire (22).

The window glass anti-fogging structure according to the first embodiment includes the heater. Therefore, the inner surface of the anti-fogging membrane, i.e., an inner surface of the window glass anti-fogging structure on the side of the vehicle interior space, can be prevented from clouding by supplying the electric power to the electric heating wire of the heater on the condition that the window glass anti-fogging structure is provided on the view-angle glass surface. In addition, the inner surface of the window glass anti-fogging structure is the inner surface of the anti-fogging membrane. Therefore, the inner surface of the window glass anti-fogging structure is unlikely to cloud. Thus, the number of supplying the electric power to the electric heating wire of the heater for preventing the inner surface of the window glass anti-fogging structure from clouding, is reduced. Therefore, an amount of the electric power consumed for preventing the inner surface of the window glass anti-fogging structure from clouding, can be reduced.

According to an aspect of the first embodiment, the window glass anti-fogging structure (20) may further include a transparent substrate layer (21) having a stiffness property. In this aspect, the transparent substrate layer (21) includes an inner surface (21in) and an outer surface (21out). The inner surface (21) of the transparent substrate layer (21) is a surface of the transparent substrate layer (21) on the side of the vehicle interior space (105) in the condition that the window glass anti-fogging structure (20) is provided on the view-angle glass surface (101A). The outer surface (21out) of the transparent substrate layer (21) is a surface of the transparent substrate layer (21) on the opposite side of the inner surface (21in) of the transparent substrate layer (21). Further, in this aspect, the anti-fogging membrane (24) is provided on the transparent substrate layer (21) such that the outer surface (24out) of the anti-fogging membrane (24) is in contact with the inner surface (21in) of the transparent substrate layer (21).

If the window glass anti-fogging structure deforms in providing the window glass anti-fogging structure on the view-angle glass surface, it is difficult to provide the window glass anti-fogging structure on the view-angle glass surface. The anti-fogging membrane of the window glass anti-fogging structure according to this aspect of the first embodiment, is provided on the transparent substrate layer having the stiffness property, the window glass anti-fogging structure is unlikely to deform in providing the window glass anti-fogging structure on the view-angle glass surface. Thereby, the window glass anti-fogging structure can be provided on the view-angle glass surface easily.

According to another aspect of the first embodiment, the at least one electric heating wire (22) may be embedded in the transparent substrate layer (21). According to further another aspect of the first embodiment, the at least one electric heating wire (22) may be provided on the inner surface (21in) of the transparent substrate layer (21). In this aspect, the anti-fogging membrane (24) is provided on the transparent substrate layer (21) such that the anti-fogging membrane (24) covers the at least one electric heating wire (22) and the inner surface (21in) of the transparent substrate layer (21).

The window glass anti-fogging structures according to these aspects of the first embodiment are formed by combining the anti-fogging membrane, the heater, and the transparent substrate layer. Thus, a vision of the vehicle-installed camera can be prevented from blurring by a simple measure of providing the window glass anti-fogging structure on the view-angle glass surface even when there is a need to take a measure for preventing the vision of the vehicle-installed camera from blurring due to the cloud of the view-angle glass surface.

According to further another aspect of the first embodiment, the anti-fogging membrane (24) may have a water absorbing property as the anti-fogging property. According to further another aspect of the first embodiment, the anti-fogging membrane (24) may have a hydrophilic property as the anti-fogging property.

An electric power supply control apparatus (90) according to the second embodiment controls a supply of the electric power to the at least one electric heating wire (22) of the heater (23) of the window glass anti-fogging structure (20). The electric power supply control apparatus (90) includes an electronic control unit (91).

The electronic control unit (91) is configured to start to supply the electric power to the at least electric heating wire (22) (see a process of a step 1040 in FIG. 10) when a switch (96) for transferring a state of the vehicle (100) to a moving ready state, is set at a position for transferring the state of the vehicle (100) to the moving ready state, and a temperature of an outside air is equal to or lower than a predetermined outside air temperature (see determinations "Yes" at steps 910 and 920 in FIG. 9, respectively and determinations "Yes" at steps 1010 and 1030 in FIG. 10, respectively).

Further, the electronic control unit (91) is configured to continue to supply the electric power to the at least electric heating wire (22) (see the process of the 1040 in FIG. 10) until a predetermined time elapses after the electronic control unit (91) starts to supply the electric power to the at least electric heating wire (22) (see the determination "Yes" at the step 1030 in FIG. 10).

Further, the electronic control unit (91) is configured to stop supplying the electric power to the at least one electric heating wire (22) (see a process of a step 1060 in FIG. 10) when the predetermined time elapses (see a determination "No" at the step 1030 in FIG. 10).

The electric power supply control apparatus according to the second embodiment supplies the electric power to the electric heating wire for the predetermined time when the state of the vehicle is transferred to the moving ready state, and the temperature of the outside air is equal to or lower than the predetermined outside air temperature. In other words, the electric power supply control apparatus according to the second embodiment supplies the electric power to the electric heating wire for the predetermined time when the state of the vehicle is transferred to the moving ready state, and the ice or the dew may be generated on a surface of the window glass on the opposite side of the inner surface of the window glass. Thus, the ice or the dew can be removed from the surface of the window glass on the opposite side of the inner surface of the window glass.

An electric power supply control apparatus (90) according to the third embodiment controls a supply of the electric power to the at least one electric heating wire (22) of the heater (23) of the window glass anti-fogging structure (20). The electric power supply control apparatus (90) according to the third embodiment includes an electronic control unit (91) configured to supply the electric power to the at least one electric heating wire (22) (see a process of a step 1160 in FIG. 11) when the electronic control unit (91) estimates that the inner surface (24in) of the anti-fogging membrane (24) clouds (see a determination "Yes" at a step 1150 in FIG. 11).

The electric power supply control apparatus according to the third embodiment supplies the electric power to the electric heating wire when the inner surface of the window glass anti-fogging structure may cloud. Thus, the inner surface of the window glass anti-fogging structure can be prevented from clouding.

According to an aspect of the third embodiment, the electronic control unit (91) may be configured to use a difference (dTair) between a temperature (Tair) of an outside air and a temperature (Tin) of an air in a vehicle interior space (105) of the vehicle (100) (see a process of a step 1140 in FIG. 11) for estimating that the inner surface (24in) of the anti-fogging membrane (24) clouds (see a process of the step 1150 in FIG. 11).

According to another aspect of the third embodiment, the electronic control unit (91) may be configured to use the difference (dTair) between the temperature (Tair) of the outside air and the temperature (Tin) of the air in the vehicle interior space (105) of the vehicle (100), and a speed (SPD) of the vehicle (100) (see the process of the step 1140 in FIG. 11) for estimating that the inner surface (24in) of the anti-fogging membrane (24) clouds (see a process of the step 1150 in FIG. 11).

According to further another aspect of the third embodiment, the electronic control unit (91) may be configured to use the difference (dTair) between the temperature (Tair) of the outside air and the temperature (Tin) of the air in the vehicle interior space (105) of the vehicle (100), the speed (SPD) of the vehicle (100), and a humidity (Hin) of the air in the vehicle interior space (105) (see the process of the step 1140 in FIG. 11) for estimating that the inner surface (24in) of the anti-fogging membrane (24) clouds (see a process of the step 1150 in FIG. 11).

According to further another aspect of the third embodiment, the electronic control unit (91) may be configured to use the difference (dTair) between the temperature (Tair) of an outside air and the temperature (Tin) of the air in the vehicle interior space (105) of the vehicle (100), and the humidity (Hin) of the air in the vehicle interior space (105) (see the process of the step 1140 in FIG. 11) for estimating that the inner surface (24in) of the anti-fogging membrane (24) clouds (see a process of the step 1150 in FIG. 11).

A vehicle-installed camera apparatus (10) according to the fourth embodiment is provided in a vehicle interior space (105) of a vehicle (100) for taking images of a view outside of the vehicle (100) through a window glass (101) of the vehicle (100).

The vehicle-installed camera apparatus (10) according to the fourth embodiment includes a vehicle-installed camera (11) for taking the images of the view outside of the vehicle (100) through the window glass (101) of the vehicle (100) and a window glass anti-fogging structure (20) provided on a view-angle glass surface (101A) of the window glass (101) of the vehicle (100) for preventing the view-angle glass surface (101A) from clouding. The view-angle glass surface (101A) is a part of the window glass (101) within a range of an angle (A) of view of the vehicle-installed camera (11).

The window glass anti-fogging structure (20) according to the fourth embodiment includes an anti-fogging membrane (24) having an anti-fogging property and a heater (23) for generating heat.

The anti-fogging membrane (24) according to the fourth embodiment includes an inner surface (24in) and an outer surface (24out). The inner surface (24in) of the anti-fogging membrane (24) is a surface of the anti-fogging membrane (24) on the side of the vehicle interior space (105) in the condition that the window glass anti-fogging structure (20) is provided on the view-angle glass surface (101A). The outer surface (24out) of the anti-fogging membrane (24) is a surface of the anti-fogging membrane (24) on the opposite side of the inner surface (24in) of the anti-fogging membrane (24). The inner surface (24in) of the anti-fogging membrane (24) according to the fourth embodiment exposes to the vehicle interior space (105) on the condition that the window glass anti-fogging structure (20) is provided on the view-angle glass surface (101A). The heater (23) according to the fourth embodiment includes at least one electric heating wire (22) which generates the heat when electric power is supplied to the at least one electric heating wire (22).

In the vehicle-installed camera apparatus according to the fourth embodiment, the inner surface of the anti-fogging membrane, i.e., the inner surface of the window glass anti-fogging structure can be prevented from clouding with the electric power being supplied to the electric heating wire of the heater on the condition that the window glass anti-fogging structure is provided on the view-angle glass surface. In addition, the inner surface of the window glass anti-fogging structure is the inner surface of the anti-fogging membrane. Thus, the inner surface of the window glass anti-fogging structure is unlikely to cloud. Thus, the number of supplying the electric power to the electric heating wire for preventing the inner surface of the window glass anti-fogging structure, is reduced. Therefore, the amount of the electric power consumed for preventing the inner surface of the window glass anti-fogging structure from clouding, can be reduced, and the inner surface of the window glass anti-fogging structure can be prevented from clouding.

In the above description, for facilitating understanding of the present disclosure, elements of the present disclosure corresponding to elements of an embodiment described later are denoted by reference symbols used in the description of the embodiment accompanied with parentheses. However, the elements of the present disclosure are not limited to the elements of the embodiment defined by the reference symbols. The other objects, features and accompanied advantages of the present disclosure can be easily understood from the description of the embodiment of the present disclosure along with the drawings.

BRIEF DESCRIPTION OF THE DRAWINGS

FIG. 11 is a view for showing a flowchart of a routine executed by the control apparatus shown in FIG. 4.

DESCRIPTION OF THE EMBODIMENTS

Below, a window glass anti-fogging structure according to an embodiment of the present disclosure, a vehicle-installed camera apparatus with the window glass anti-fogging structure according to the embodiment, and a control apparatus of the vehicle-installed camera apparatus, will be described with reference to the drawings.

Figure 1A:
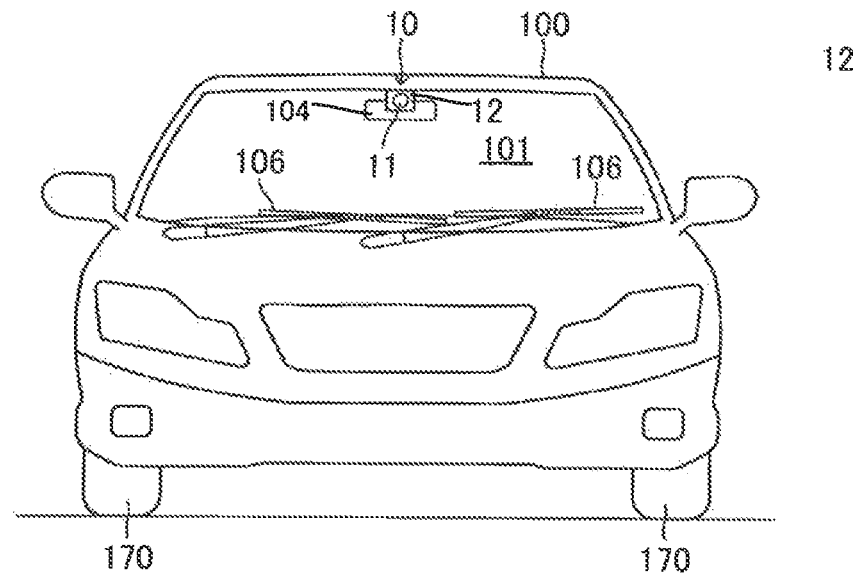
FIG. 1A is a front view for showing a vehicle, to which a window glass anti-fogging structure according to an embodiment of the present disclosure, a vehicle-installed camera apparatus with the window gall anti-fogging structure according to the embodiment, and an electric power supply control apparatus for controlling a supply of electric power to the window glass anti-fogging structure according to the embodiment, are applied.
Figure 1B:
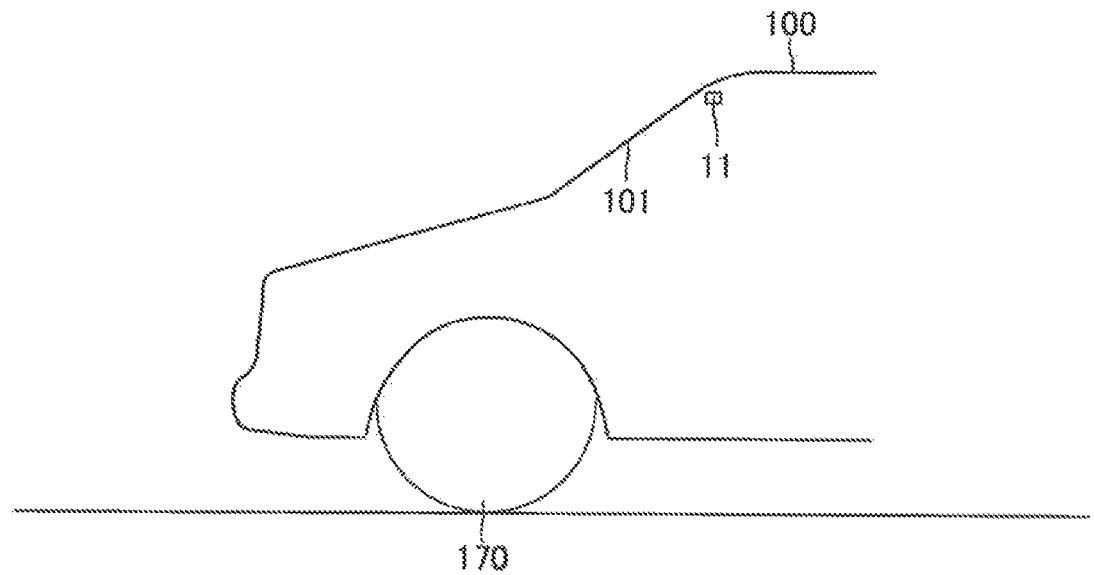
FIG. 1B is a side view for showing the vehicle shown in FIG. 1A.
Figure 2:
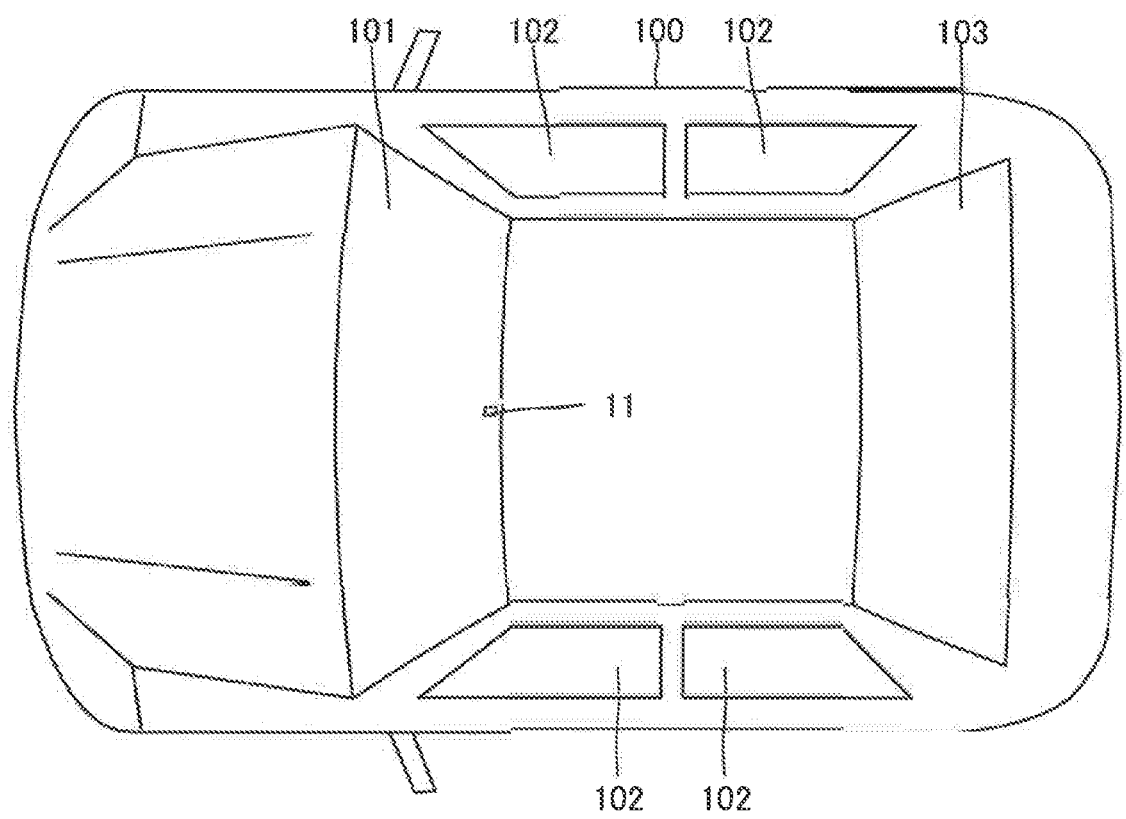
FIG. 2 is a top view of the vehicle shown in FIG. 1A.

As shown in FIG. 1A, FIG. 1B, and FIG. 2, a vehicle-installed camera apparatus 10 according to the embodiment is applied to a vehicle 100. The vehicle 100 includes a front glass 101, side glasses 102, and a rear glass 103.

Figure 3:
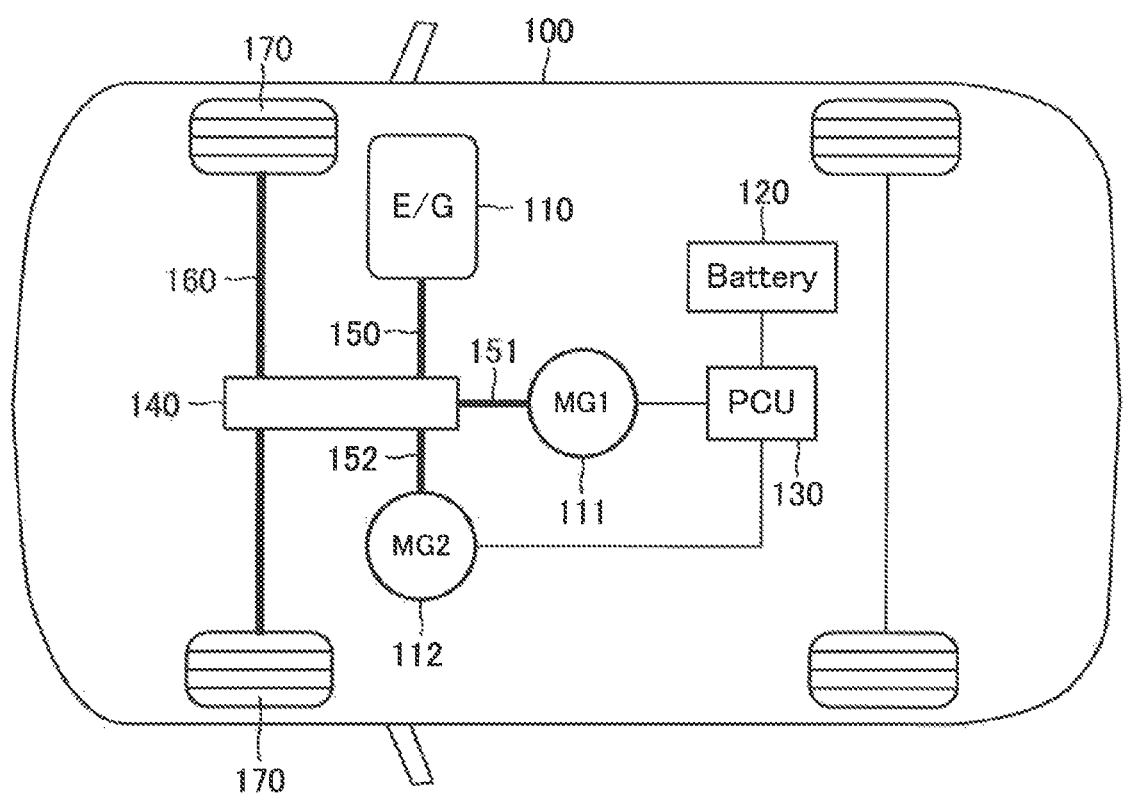
FIG. 3 is a top view similar to FIG. 2 for showing the vehicle shown in FIG. 1A with an internal combustion engine, motor generators, etc.

As shown in FIG. 3, an internal combustion engine 110, a first motor generator 111, and a second motor generator 112 are installed in the vehicle 100 as vehicle driving force sources for applying driving force to the vehicle 100 to move the vehicle 100.

Figure 4:
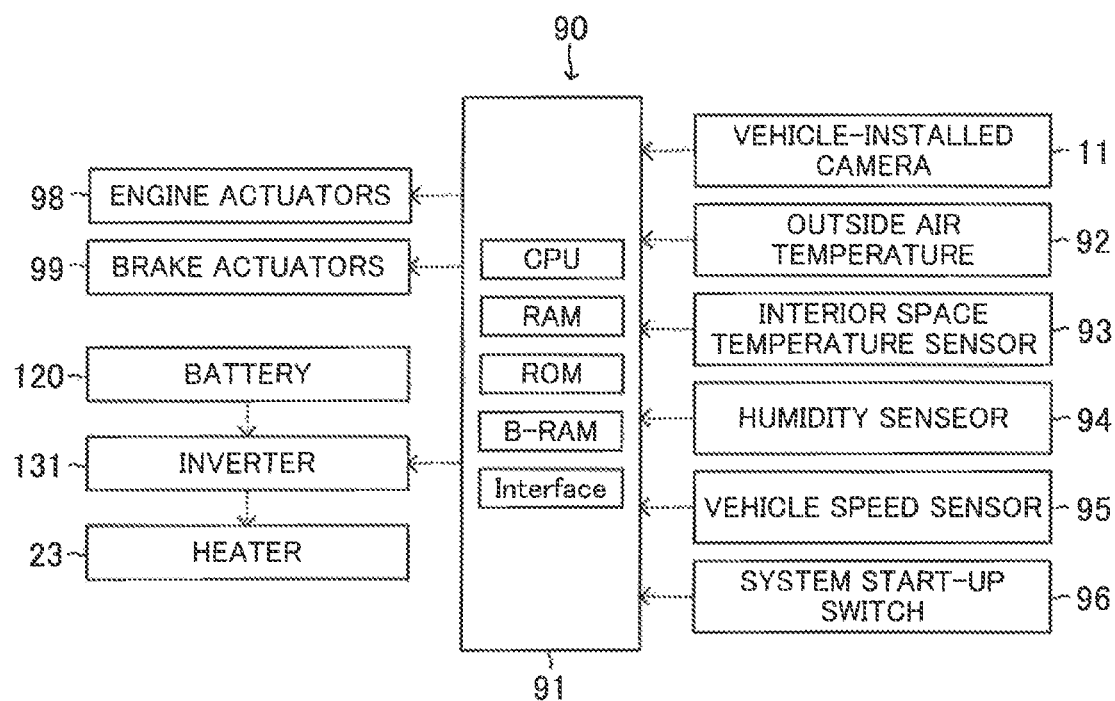
FIG. 4 is a view for showing a control apparatus of the vehicle-installed camera apparatus with the window glass anti-fogging structure according to the embodiment.

In addition, a battery 120, a power control unit 130, a power distribution mechanism 140, etc. are installed in the vehicle 100. The power control unit 130 includes an inverter 131 as shown in FIG. 4, a boost converter, a DC/DC converter, etc. Hereinafter, the power control unit 130 will be referred to as "the PCU 130".

In this embodiment, the vehicle 100 is a so-called hybrid vehicle which is moved by driving force output from at least one of the engine 110, the first motor generator 111, and the second motor generator 112.

In this regard, the vehicle 100 may be a so-called plug-in hybrid vehicle in which the battery 120 can be charged by an external electric power source. Alternatively, the vehicle 100 may be the hybrid vehicle which includes only one motor generator and is moved by the driving force output from at least one of the motor generator and the engine 110. Alternatively, the vehicle 100 may be the hybrid vehicle which includes only one motor generator, is moved by the driving force output from at least one of the motor generator and the engine 110 and uses the driving force output from the engine 110 to generate electric power by an electric power generator. Alternatively, the vehicle 100 may be a vehicle provided with the engine 110 without the motor generator as the vehicle driving force souse.

The power distribution mechanism 140 is, for example, a planetary gear mechanism. The power distribution mechanism 140 distributes a torque input into the power distribution mechanism 140 from the engine 110 via an output shaft 150, into a torque for rotating an output shaft of the power distribution mechanism 140 and a torque for activating the first motor generator 111 as an electric power generator with a predetermined proportion or a predetermined distribution property. Hereinafter, the torque output from the engine 110 will be referred to as "the engine torque".

The power distribution mechanism 140 transmits the torque input into the power distribution mechanism 140 from the second motor generator 112 and the engine torque, to front wheels 170 via a wheel drive shaft 160. The power distribution mechanism 140 is known (for example, see JP 2013-177026 A). Hereinafter, each of the front wheels 170 will be referred to as "the driving wheel 170".

The first and second motor generators 111 and 112 are permanent magnet synchronous electric motors, respectively. The first and second motor generators 111 and 112 are electrically connected to the battery 120 via the inverter 131 of the PCU 130, respectively.

The first motor generator 111 is operatively connected to the power distribution mechanism 140 via an input/output shaft 151. The first motor generator 111 is mainly used as an electric generator. When the first motor generator 111 is used as the electric generator, a rotation shaft of the first motor generator 111 is rotated by an external force such as a moving energy of the vehicle 100 and the engine torque to generate the electric power. The generated electric power is charged in the battery 120 via the inverter 131 of the PCU 130. The first motor generator 111 is also used as an electric motor. When the first motor generator 111 is used as the electric motor, the first motor generator 111 is activated by the electric power supplied from the battery 120 via the inverter 131 of the PCU 130.

The second motor generator 112 is operatively connected to the power distribution mechanism 140 via an input/output shaft 152. The second motor generator 112 is mainly used as the electric motor. When the second motor generator 112 is used as the electric motor, the second motor generator 112 is activated by the electric power supplied from the battery 120 via the inverter 131 of the PCU 130. The second motor generator 112 is also used as the electric generator. When the second motor generator 112 is used as the electric generator, a rotation shaft of the second motor generator 112 is rotated by the external force to generate the electric power. The generated electric power is charged in the battery 120 via the inverter 131 of the PCU 130.

As shown in FIG. 4, a control apparatus 90 according to the embodiment includes an ECU 91. The ECU 91 is an electronic control unit which is an electronic control circuit including a microcomputer as a main component including a CPU, a ROM, a RAM, a buck-up RAM, an interface, etc. The CPU realizes various functions described later by executing instructions or routines stored in a memory (i.e. the ROM).

As known, the control apparatus 90 calculates an output power to be supplied to the driving wheels 170 via the wheel drive shaft 160. Hereinafter, the output power to be supplied to the driving wheels 170 via the wheel drive shaft 160, will be referred to as "the requested driving force PDreq". The control apparatus 90 calculates a power to be output from the engine 110 to the power distribution mechanism 140, a power to be output from the first motor generator 111 to the power distribution mechanism 140, and a power to be output from the second motor generator 112 to the power distribution mechanism 140 as a target engine output power PEtgt, a target first motor generator output power PM1tgt, and a target second motor generator output power PM2tgt, respectively on the basis of the requested driving force PDreq.

The control apparatus 90 controls an operation of the engine 110 to output an output power corresponding to the target engine output power PEtgt from the engine 110 to the power distribution mechanism 140 and an activation of the inverter 131 to output an output power corresponding to the target first motor generator output power PM1tgt from the first motor generator 111 to the power distribution mechanism 140, and the activation of the inverter 131 to output an output power corresponding to the target second motor generator output power PM2tgt from the second motor generator 112 to the power distribution mechanism 140.

<Vehicle-Installed Camera Apparatus>

The vehicle-installed camera apparatus 10 includes a vehicle-installed camera 11 and a bracket 12. The vehicle-installed camera 11 is mounted on the bracket 12. The bracket 12 is secured to a portion of the front glass 101 in front of a room mirror 104 in a longitudinal direction of the vehicle 100. The bracket 12 is secured to the portion of the front glass 101 such that the vehicle-installed camera 11 can take images of a view within a predetermined area in front of the vehicle 100. In other words, the vehicle-installed camera 11 is provided between the room mirror 104 and the front glass 101 by the bracket 12 in the longitudinal direction of the vehicle 100.

Figure 5A:
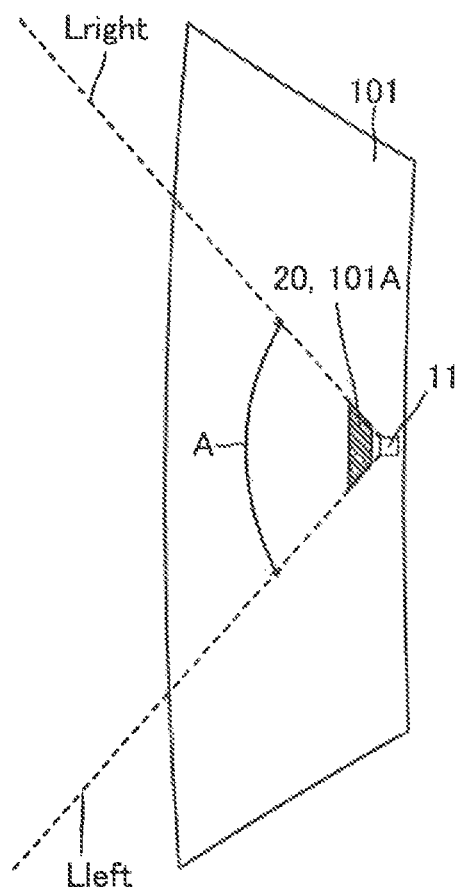
FIG. 5A is a top view of a front glass of the vehicle shown in FIG. 1A
Figure 5B:
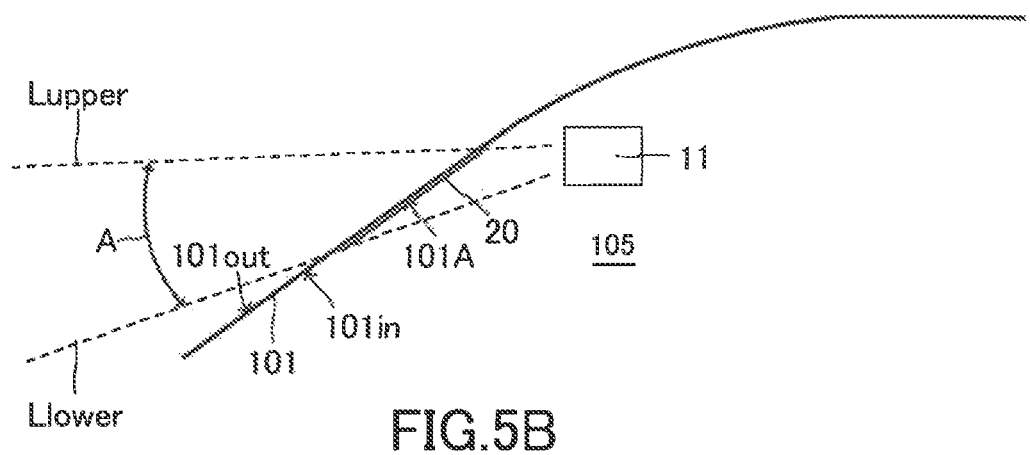
FIG. 5B is a side view of the front glass of the vehicle shown in FIG. 1A.

As shown in FIG. 5A and FIG. 5B, the vehicle-installed camera 11 has an angle A of view. The angle A of view represents a range which the vehicle-installed camera 11 can take the images. The angle A of view of the vehicle-installed camera 11 defined by a line Lright and a line Lleft in FIG. 5A is an angle of view when viewing the vehicle-installed camera 11 from upside of the vehicle 100 with the vehicle-installed camera 11 being mounted on the vehicle 100. In other words, the angle A of view of the vehicle-installed camera 11 defined by a line Lright and a line Lleft in FIG. 5A is an angle of view in a horizontal direction. On the other hand, the angle A of view of the vehicle-installed camera 11 defined by a line Lupper and a Llower in FIG. 5B is an angle of view when viewing the vehicle-installed camera 11 laterally with respect to the vehicle 100 with the vehicle-installed camera 11 being mounted on the vehicle 100. In other words, the angle A of view of the vehicle-installed camera 11 defined by the line Lupper and the line Llower in FIG. 5B is an angle of view in a vertical direction.

<Window Glass Anti-Fogging Structure>

As shown in FIG. 5A, the vehicle-installed camera apparatus 10 includes a window glass anti-fogging structure 20. The window glass anti-fogging structure 20 has a sheet-like thin transparent structure body. The window glass anti-fogging structure 20 is provided on a surface 101in of the front glass 101 within the angle A of view of the vehicle-installed camera 11 at the side of a vehicle interior space 105 of the vehicle 100. Hereinafter, the surface 101in of the front glass 101 within the angle A of view of the vehicle-installed camera 11 at the side of the vehicle interior space 105, will be referred to as "the view-angle glass surface 101A".

The window glass anti-fogging structure 20 is used for preventing the view-angle glass surface 101A from clouding. If there is cloud or ice on the view-angle glass surface 101A, the window glass anti-fogging structure 20 is used for removing the cloud or the ice from the view-angle glass surface 101A. It should be noted that the cloud or the ice is generated on the view-angle glass surface 101A, mainly by dew condensation and freeze of water included in air in the vehicle interior space 105.

In this embodiment, the view-angle glass surface 101A has a trapezoidal shape. Thus, a shape of the window glass anti-fogging structure 20 corresponds to the shape of the view-angle glass surface 101A. That is, the window glass anti-fogging structure 20 has a trapezoidal shape. In this regard, when the view-angle glass surface 101A has a shape other than the trapezoidal shape, the window glass anti-fogging structure 20 is formed to have a shape corresponding to the shape of the view-angle glass surface 101A.

Further, in this embodiment, a size of the window glass anti-fogging structure 20 is the same as a size of the view-angle glass surface 101A. In this regard, the window glass anti-fogging structure 20 may have the size equal or larger than the size of the view-angle glass surface 101A. Therefore, the size of the window glass anti-fogging structure 20 may be equal to or larger than the size of the view-angle glass surface 101A.

When the vehicle-installed camera 11 is provided on the vehicle 100 such that the vehicle-installed camera 11 takes the images of the view outside of the vehicle 100 from the vehicle interior space 105 through the side glass 102, the window glass anti-fogging structure 20 may be provided on a surface of the side glass 102 on the side of the vehicle interior space 105 within the range of the angle A of view of the vehicle-installed camera 11. Similarly, when the vehicle-installed camera 11 is provided on the vehicle 100 such that the vehicle-installed camera 11 takes the images of the view outside of the vehicle 100 from the vehicle interior space 105 through the rear glass 103, the window glass anti-fogging structure 20 may be provided on a surface of the rear glass 103 on the side of the vehicle interior space 105 within the range of the angle A of view of the vehicle-installed camera 11.

Figure 6A:
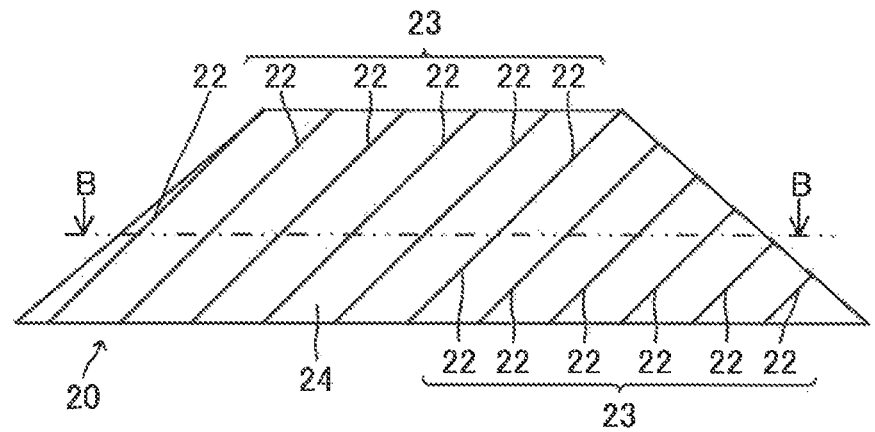
FIG. 6A is a view for showing the window glass anti-fogging structure according to the embodiment.
Figure 6B:
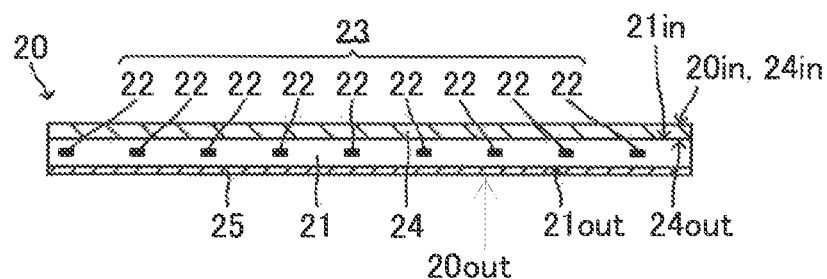
FIG. 6B is a sectional view for showing the window glass anti-fogging structure according to the embodiment along a line B-B of FIG. 6A.
Figure 6C:
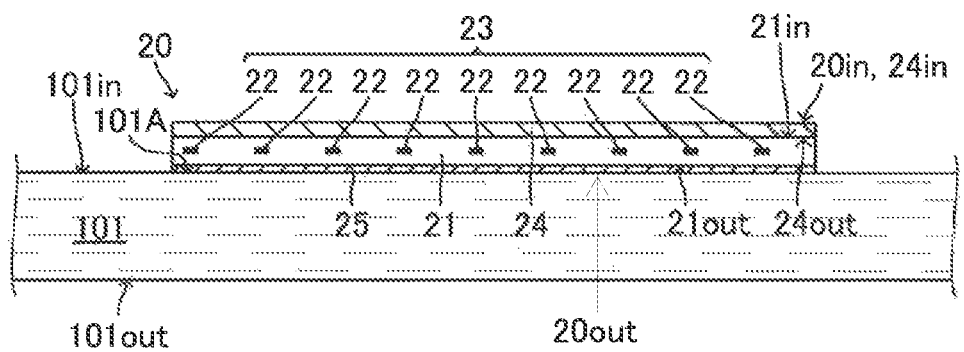
FIG. 6C is a sectional view for showing the window glass anti-fogging structure according to the embodiment and the front glass.

As shown in FIG. 6A, FIG. 6B, and FIG. 6C, the window glass anti-fogging structure 20 has a sheet-like structure body formed by combining a sheet-like transparent substrate layer 21, a heater 23 formed by electric heating wires 22, a sheet-like anti-fogging membrane 24, and an adhesive layer 25. In the drawings including FIG. 6A, FIG. 6B, and FIG. 6C, sizes of the transparent substrate layer 21, the electric heating wires 22, the anti-fogging membrane 24, and the adhesive layer 25 are larger than the actual sizes of the transparent substrate layer 21, the electric heating wires 22, the anti-fogging membrane 24, and the adhesive layer 25, respectively for the sake of facilitating the understanding of the drawings.

If the window glass anti-fogging structure 20 deforms considerably in placing the window glass anti-fogging structure 20 on the view-angle glass surface 101A, it is difficult to place the window glass anti-fogging structure 20 on the front glass 101. The transparent substrate layer 21 is a layer of a transparent substrate. In addition, the transparent substrate layer 21 has a stiffness property capable of restricting a deformation of the window glass anti-fogging structure 20 to an extent that the window glass anti-fogging structure 20 is easily adhered to the view-angle glass surface 101A.

In addition, the transparent substrate layer 21 has a heat resistance to a high temperature. In particular, the transparent substrate layer 21 has the heat resistance to the temperature increased, for example, by direct ray of the sun on the front glass 101 in summer. In addition, the transparent substrate layer 21 has the heat resistance to heat generated by the heater 23.

In this embodiment, the size of the transparent substrate layer 21 is the same as the size of the view-angle glass surface 101A. In this regard, the size of the transparent substrate layer 21 may be larger than the size of the view-angle glass surface 101A.

The electric heating wires 22 of the heater 23 are embedded in the transparent substrate layer 21, spacing apart from each other by a constant distance. The heater 23 is electrically connected to the battery 120 via the inverter 131. The electric power is supplied to the electric heating wires 22 of the heater 23 from the battery 120 via the inverter 131. When the electric power is supplied to the electric heating wires 22, the electric heating wires 22 generate the heat.

The number of the electric heating wires 22 embedded in the transparent substrate layer 21 are set to the number capable of melting and removing the ice from an outer surface 101out of the front glass 101, i.e., the surface 101out of the front glass 101 on the opposite side of the vehicle interior space 105 when the electric power having a certain electric voltage is supplied to the electric heating wires 22 from the battery 120. In addition, the number of the electric heating wires 22 embedded in the transparent substrate layer 21 are set to the number, which the electric heating wires 22 generate an amount of the heat capable of preventing a surface 20in of the window glass anti-fogging structure 20 adhered to the view-angle glass surface 101A on the side of the vehicle interior space 105, i.e., the surface 24in of the anti-fogging membrane 24 on the side of the vehicle interior space 105, from clouding.

Hereinafter, the surface 101out of the front glass 101 on the opposite side of the vehicle interior space 105, will be referred to as "the front glass outer surface 101out".

Further, the surface 20in of the window glass anti-fogging structure 20 at the side of the vehicle interior space 105, i.e., the surface 20in of the window glass anti-fogging structure 20 exposing to the vehicle interior space 105 on the condition that the window glass anti-fogging structure 20 is placed on the view-angle glass surface 101A, will be referred to as "the inner surface 20in of the window glass anti-fogging structure 20". Further, a surface 20out of the window glass anti-fogging structure 20 at the opposite side of the vehicle interior space 105 on the condition that the window glass anti-fogging structure 20 is placed on the view-angle glass surface 101A, will be referred to as "the outer surface 20out of the window glass anti-fogging structure 20".

Further, the surface 24in of the anti-fogging membrane 24 on the side of the vehicle interior space 105, i.e., the surface 24in of the anti-fogging membrane 24 exposing to the vehicle interior space 105 on the condition that the window glass anti-fogging structure 20 is placed on the view-angle glass surface 101A, will be referred to as "the inner surface 24in of the anti-fogging membrane 24". Further a surface 24out of the anti-fogging membrane 24 on the opposite side of the vehicle interior space 105 on the condition that the window glass anti-fogging structure 20 is placed on the view-angle glass surface 101A, will be referred to as "the outer surface 24out of the anti-fogging membrane 24".

Further, a surface 21in of the transparent substrate layer 21 on the side of the vehicle interior space 105 on the condition that the window glass anti-fogging structure 20 is placed on the view-angle glass surface 101A, will be referred to as "the inner surface 21in of the transparent substrate layer 21". Further, a surface 21out of the transparent substrate layer 21 on the opposite side of the vehicle interior space 105 on the condition that the window glass anti-fogging structure 20 is placed on the view-angle glass surface 101A, will be referred to as "the outer surface 21out of the transparent substrate layer 21".

The heater 23 formed of the electric heating wires 22 is a so-called PTC heater (Positive Temperature Coefficient heater). The PTC heater has a property that an electric resistance thereof increases as a temperature thereof is increased by the heat generated by the PTC heater. Thus, the PTC heater has a property that an electric current becomes unlikely to flow in the PTC heater as the temperature thereof is increased by the heat generated by the PTC heater, and the electric current becomes likely to flow in the PTC heater as the temperature thereof decreases by stopping supplying electric power to the PTC heater.

The anti-fogging membrane 24 is a single membrane. The anti-fogging membrane 24 is provided on the transparent substrate layer 21 by attaching the outer surface 24out of the anti-fogging membrane 24 to the inner surface 21in of the transparent substrate layer 21. In this regard, the anti-fogging membrane 24 may be provided on the inner surface 21in of the transparent substrate layer 21, for example, by applying material for forming the anti-fogging membrane 24, to the inner surface 21in of the transparent substrate layer 21.

The size of the anti-fogging membrane 24 is the same as the size of the transparent substrate layer 21. In this regard, even when the size of the transparent substrate layer 21 is larger than the size of the view-angle glass surface 101A, the size of the anti-fogging membrane 24 may be the same as the size of the view-angle glass surface 101A, that is, smaller than the size of the transparent substrate layer 21. Alternatively, when the size of the transparent substrate layer 21 is larger than the size of the view-angle glass surface 101A, the size of the anti-fogging membrane 24 may be larger than the view-angle glass surface 101A within the size of the transparent substrate layer 21. In this case, for example, the size of the anti-fogging membrane 24 may be the same as the size of the transparent substrate layer 21.

The anti-fogging membrane 24 has a water-absorbing property of absorbing the water. In addition, the anti-fogging membrane 24 has a hydrophilic property and thus, is unlikely to repel the water. Thus, the cloud is unlikely to be generated on the inner surface 24in of the anti-fogging membrane 24 on the condition that the window glass anti-fogging structure 20 is provided on the view-angle glass surface 101A even when a difference in temperature between the outer surface 24out of the anti-fogging membrane 24 and the inner surface 24in of the anti-fogging membrane 24.

In addition, the anti-fogging membrane 24 has a heat-resisting property of resisting high temperature. The anti-fogging membrane 24 has the heat-resisting property that the anti-fogging membrane 24 can resist the temperature increased, for example, by the direct ray of the sun to the front glass 101 in summer.

The adhesive layer 25 is provided on the outer surface 21out of the transparent substrate layer 21. The window glass anti-fogging structure 20 is provided on the view-angle glass surface 101A by attaching the window glass anti-fogging structure 20 to the view-angle glass surface 101A by the adhesive layer 25 such that the window glass anti-fogging structure 20 covers the view-angle glass surface 101A entirely.

The window glass anti-fogging structure 20 is formed by combining the transparent substrate layer 21, the heater 23, the anti-fogging membrane 24, and the adhesive layer 25. Thus, when there is a need to take a measure for preventing the view-angle glass surface 101A from clouding to prevent a vision of the vehicle-installed camera 11 from blurring, the vision of the vehicle-installed camera 11 can be prevented from blurring by a simple measure of attaching the window glass anti-fogging structure 20 to the view-angle glass surface 101A.

Further, the window glass anti-fogging structure 20 is a structure having the stiffness property. Thus, the window glass anti-fogging structure 20 is unlikely to deform when the window glass anti-fogging structure 20 is attached to the view-angle glass surface 101A. Therefore, the window glass anti-fogging structure 20 can be easily attached to the view-angle glass surface 101A.

Further, the window glass anti-fogging structure 20 includes the heater 23. Thus, the cloud can be prevented from being generated on the inner surface 20in of the window glass anti-fogging structure 20 by supplying the electric power to the heater 23. In this embodiment, the inner surface 20in of the window glass anti-fogging structure 20 is formed by the inner surface 24in of the anti-fogging membrane 24. Thus, the inner surface 20in of the window glass anti-fogging structure 20 is unlikely to cloud. Therefore, the number of supplying the electric power to the heater 23 for preventing the inner surface 20in of the window glass anti-fogging structure 20 from clouding, is reduced. Thus, an amount of the electric power consumed for preventing the inner surface 20in of the window glass anti-fogging structure 20 from clouding, can be reduced.

<Control Apparatus of Vehicle-Installed Camera Apparatus>

The vehicle-installed camera 11, an outside air temperature sensor 92, an interior space temperature sensor 93, a humidity sensor 94, a vehicle speed sensor 95, and a system start-up switch 96 are electrically connected to the ECU 91.

The outside air temperature sensor 92 is mounted at a suitable portion of the vehicle 100 such that the outside air temperature sensor 92 can detect a temperature outside of the vehicle 100, that is, a temperature Tair of the outside air. The outside air temperature sensor 92 detects the temperature Tair of the outside air and outputs a signal representing the detected temperature Tair to the ECU 91. The ECU 91 acquires the temperature Tair of the outside air as an outside air temperature Tair on the basis of the signal output from the outside air temperature sensor 92.

The interior space temperature sensor 93 is mounted at a suitable portion of the vehicle 100 such that the interior space temperature sensor 93 can detect a temperature Tin of the air in the vehicle interior space 105. The interior space temperature sensor 93 detects the temperature Tin of the air in the vehicle interior space 105 and outputs a signal representing the detected temperature Tin to the ECU 91. The ECU 91 acquires the temperature Tin of the air in the vehicle interior space 105 as an interior space temperature Tin on the basis of the signal output from the interior space temperature sensor 93.

The humidity sensor 94 is mounted at a suitable portion of the vehicle 100 such that the humidity sensor 94 can detect a relative humidity Hin of the air in the vehicle interior space 105. The humidity sensor 94 detects the relative humidity Hin of the air in the vehicle interior space 105 and outputs a signal representing the detected relative humidity Hin to the ECU 91. The ECU 91 acquires the relative humidity Hin of the air in the vehicle interior space 105 as an interior space humidity Hin on the basis of the signal output from the humidity sensor 94.

The vehicle speed sensor 95 detects a rotation speed Nspd of the driving wheel 170 of the vehicle 100 and outputs a signal representing the detected rotation speed Nspd to the ECU 91. The ECU 91 acquires a speed SPD of the vehicle 100 as a vehicle speed SPD on the basis of the signal output from the vehicle speed sensor 95.

The system start-up switch 96 is a switch operated by a driver of the vehicle 100. When the system start-up switch 96 is set at an ON position by the driver, the ECU 91 becomes ready to operate the engine 110 and/or activate the first motor generator 111 and/or activate the second motor generator 112, depending on the requested driving force PDreq. On the other hand, when the system start-up switch 96 is set at an OFF position by the driver, the ECU 91 stops operating the engine 110 and activating the first and second motor generators 111 and 112.

Therefore, the system start-up switch 96 is a switch for transferring a state of the vehicle 100 to a moving ready state. The state of the vehicle 100 is transferred to the moving ready state when the system start-up switch 96 is set at the ON position.

In a vehicle provided with the engine 110 only as the vehicle driving force source, a so-called ignition switch operated by the driver for starting to operate the engine 110, is the switch for transferring the state of the vehicle to the moving ready state.

Further, an engine actuators 98 such as fuel injectors (not shown) of the engine 110, are electrically connected to the ECU 91. The ECU 91 starts to operate the engine 110 by controlling activations of the engine actuators 98.

Further, brake actuators 99 for applying braking force to the vehicle 100, are electrically connected to the ECU 91. The ECU 91 controls a braking of the vehicle 100 by controlling activations of the brake actuators 99.

The inverter 131 is electrically connected to the ECU 91. The ECU 91 controls the supply of the electric power from the battery 120 to the first motor generator 111, the second motor generator 112, and the heater 23 by controlling the activation of the inverter 131.

<Summary of Operation of Control Apparatus>

Next, a summary of an operation of the control apparatus 90 will be described.

<Start-Up Heater Activation Control>

The ice may be generated on the front glass outer surface 101out when the vehicle 100 stops, and the outside air temperature Tair is below zero degrees C., for example, in winter. Otherwise, the dew may be generated on the front glass outer surface 101out when the vehicle 100 stops, and the outside air temperature Tair is not below zero degrees C., but relatively low. In these cases, the ice or the dew may be generated on the front glass outer surface 101out corresponding to the view-angle glass surface 101A. Thus, the vehicle-installed camera 11 may not take the images of the view in front of the vehicle 100 appropriately. As a result, the control apparatus 90 may not execute various controls on the basis of data of the images of the view taken by the vehicle-installed camera 11.

When there is the dew on the front glass outer surface 101out, the driver may activate windshield wipers 106 for removing the dew from the front glass outer surface 101out. Therefore, even when there is the dew on the front glass outer surface 101out, the vehicle-installed camera 11 may take the images of the view in front of the vehicle 100 appropriately since the dew may be removed from the front glass outer surface 101out.

On the other hand, when there is the ice on the front glass outer surface 101out, the ice may not be removed from the front glass outer surface 101out even when the driver activates the windshield wipers 106.

Figure 7:
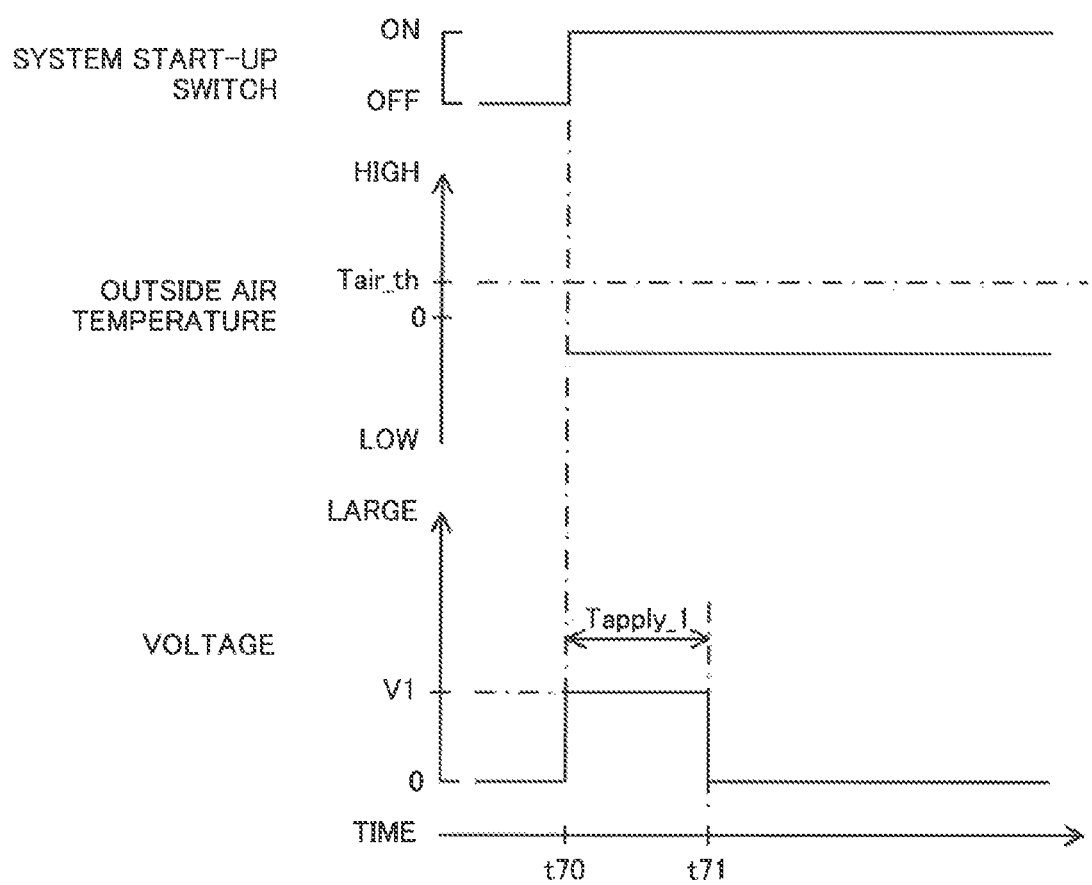
FIG. 7 is a view for showing a time chart used for describing an activation of the control apparatus shown in FIG. 4.

Accordingly, the control apparatus 90 determines that the ice may be generated on the front glass outer surface 101out and as a result, the ice may be generated on a portion of the front glass outer surface 101out corresponding to the view-angle glass surface 101A when the system start-up switch 96 is set at the ON position, and the outside air temperature Tair is equal to or lower than a predetermined outside air temperature Tair_th (see a time t70 in FIG. 7). In this case, the control apparatus 90 determines that an activation of the heater 23 is requested for removing the ice from the portion of the front glass outer surface 101out corresponding to the view-angle glass surface 101A. Hereinafter, the activation of the heater 23 for removing the ice from the portion of the front glass outer surface 101out corresponding to the view-angle glass surface 101A, will be referred to as "the ice removing activation of the heater 23".

When the control apparatus 90 determines that the ice removing activation of the heater 23 is requested, the control apparatus 90 executes a start-up heater activation control for applying an electric power having a constant electric voltage V1, from the battery 120 to the heater 23 for a predetermined application time Tapply_1 (see a period from the time t70 to a time t71 in FIG. 7). In this case, the control apparatus 90 sets the predetermined application time Tapply_1 such that the predetermined application time Tapply_1 becomes long as the outside air temperature difference dTair corresponding to the difference between the predetermined outside air temperature Tair_th and the outside air temperature Tair (dTair=Tair−Tair_th), becomes large.

Thereby, the ice is removed from the front glass outer surface 101out even when there is the ice on the front glass outer surface 101out at a time of setting the system start-up switch 96 at the ON position. Thus, the vehicle-installed camera 11 can take the images of the view in front of the vehicle 100 appropriately.

After the control apparatus 90 stops executing the start-up heater activation control, the inner surface 20in of the window glass anti-fogging structure 20 is prevented from clouding since the inner surface 20in of the window glass anti-fogging structure 20 is formed by the inner surface 24in of the anti-fogging membrane 24 even when a situation that the inner surface 20in of the window glass anti-fogging structure 20 is likely to cloud. Thus, the view of the vehicle-installed camera 11 is prevented from clouding.

In this embodiment, the predetermined outside air temperature Tair_th is set to the highest temperature, at which the ice is generated on the front glass outer surface 101out and stored in the ROM of the ECU 91.

Further, in this embodiment, the constant electric voltage V1 and the predetermined application time Tapply_1 are set to an electric voltage and a time capable of removing the ice from the front glass outer surface 101out and minimizing a total amount of the electric power supplied to the heater 23 when the electric power having the constant electric voltage V1, is supplied to the heater 23 for the predetermined application time Tapply_1, respectively. The constant electric voltage V1 and the predetermined application time Tapply_1 are acquired on the basis of results of an experiment, etc., respectively and stored in the ROM of the ECU 91. In this embodiment, the predetermined application time Tapply_1 is stored in the ROM of the ECU 91 in the form of a look-up table MapTapply_1(dTair) having the outside air temperature difference dTair as a parameter for acquiring the predetermined application time Tapply_1.

The control apparatus 90 may be configured to supply the electric power having a predetermined electric voltage V2, to the heater 23 from the battery 120 for a constant application time Tapply_2 when the control apparatus 90 determines that the ice removing heater activation is requested. In this case, the control apparatus 90 sets the predetermined electric voltage V2 to a larger electric voltage as the difference dTair between the predetermined outside air temperature Tair_th and the outside air temperature Tair (dTair=Tair−Tair_th) increases. The predetermined electric voltage V2 and the constant application time Tapply_2 are set to an electric voltage and a time capable of removing the ice from the front glass outer surface 101out and minimizing the total amount of the electric power supplied to the heater 23 when the electric power having the predetermined electric voltage V2, is supplied to the heater 23 for the constant application time Tapply_2, respectively. The predetermined electric voltage V2 and the constant application time Tapply_2 are acquired on the basis of results of an experiment, etc., respectively and stored in the ROM of the ECU 91. In this embodiment, the predetermined electric voltage V2 is stored in the ROM of the ECU 91 in the form of a look-up table MapV2(dTair) having the outside air temperature difference dTair as a parameter for acquiring the predetermined electric voltage V2.

As described above, in this embodiment, the control apparatus 90 is configured on the assumption that the driver activates the windshield wipers 106 for removing the dew when the system start-up switch 96 is set at the ON position, and there is the dew on the front glass outer surface 101out. Therefore, the control apparatus 90 supplies the electric power having the constant electric voltage V1, to the heater 23 for the predetermined application time Tapply_1 so as to remove the ice when the system start-up switch 96 is set at the ON position, and the ice may be generated on the front glass outer surface 101out. In this regard, the control apparatus 90 may be configured to supply the electric power having a constant electric voltage V3, to the heater 23 for a predetermined application time Tapply_3 so as to remove the dew from the front glass outer surface 101out when the system start-up switch 96 is set at the ON position, and the dew may be generated on the front glass outer surface 101out.

In this case, the constant electric voltage V3 and the predetermined application time Tapply_3 are set to an electric voltage and a time capable of removing the dew from the front glass outer surface 101out and minimizing the total amount of the electric power supplied to the heater 23 when the electric power having the constant electric voltage V3, is applied to the heater 23 for the predetermined application time Tapply_3, respectively. The constant electric voltage V3 and the predetermined application time Tapply_3 are acquired on the basis of results of an experiment, etc., respectively and stored in the ROM of the ECU 91. In this embodiment, the predetermined application time Tapply_3 is stored in the ROM of the ECU 91 in the form of a look-up table MapTapply_3(dTair) having the outside air temperature difference dTair as a parameter for acquiring the predetermined application time Tapply_3.

<Post-Start-Up Heater Activation Control>

Basically, the view of the vehicle-installed camera 11 is prevented from clouding by the window glass anti-fogging structure 20. However, when the outside air temperature Tair is lower than the interior space temperature Tin, and a difference dTin between the interior space temperature Tin and the outside air temperature Tair (dTin=Tin−Tair) is large considerably, the inner surface 20in of the window glass anti-fogging structure 20 may cloud. In this case, the inner surface 20in of the window glass anti-fogging structure 20 becomes likely to cloud as the vehicle speed SPD increases. In addition, the inner surface 20in of the window glass anti-fogging structure 20 become likely to cloud as the interior space humidity Hin is high.

Accordingly, the control apparatus 90 determines whether the inner surface 20in of the window glass anti-fogging structure 20 is likely to cloud on the basis of the difference dTin between the interior space temperature Tin and the outside air temperature Tair (dTin=Tin−Tair), the vehicle speed SPD, and the interior space humidity Hin when the outside air temperature Tair is lower than the interior space temperature Tin. In other words, the control apparatus 90 determines whether a process of activating the heater 23 for preventing the inner surface 24in of the anti-fogging membrane 24 from clouding, is requested when the outside air temperature Tair is lower than the interior space temperature Tin. Hereinafter, the process of activating the heater 23 for preventing the inner surface 24in of the anti-fogging membrane 24 from clouding, will be referred to as "the anti-fogging heater activation process".

In particular, the control apparatus 90 acquires a difference between the interior space temperature Tin and the outside air temperature Tair as an interior space temperature difference dTin (=Tin−Tair) when the outside air temperature Tair is lower than the interior space temperature Tin.

In addition, the control apparatus 90 acquires a correction coefficient Kspd for correcting the interior space temperature difference dTin, depending on the vehicle speed SPD. In addition, the control apparatus 90 acquires a correction coefficient Khin for correcting the interior space temperature difference dTin, depending on the interior space humidity Hin. In this regard, the correction coefficient Kspd acquired by the control apparatus 90 becomes large as the vehicle speed SPD becomes large. The correction coefficient Kspd is equal to or larger than 1. Further, the correction coefficient Khin acquired by the control apparatus 90 becomes large as the interior space humidity Hin becomes high. The correction coefficient Khin is equal to or larger than 1.

Then, the control apparatus 90 acquires a value acquired by correcting the interior space temperature difference dTin by the correction coefficient Kspd and the correction coefficient Khin as a corrected Interior space temperature difference dTin_cor (=dTin*Kspd*Khin).

When the corrected interior space temperature difference dTin_cor is equal to or larger than a predetermined interior temperature difference dTin_cor_th (see a period from a time t80 to a time t81 in FIG. 8), the inner surface 20in of the window glass anti-fogging structure 20 is likely to cloud. Accordingly, the control apparatus 90 determines that the anti-fogging heater activation process is requested when the corrected interior space temperature difference dTin_cor is equal to or larger than the predetermined interior space temperature difference dTin_cor_th.

In this embodiment, the predetermined interior space temperature difference dTin_cor_th is a minimum value of the corrected interior space temperature difference dTin_cor which causes the inner surface 20in of the window glass anti-fogging structure 20 to cloud. The predetermined interior space temperature difference dTin_cor_th is acquired on the basis of results of an experiment, etc. and is stored in the ROM of the ECU 91.

Figure 8:
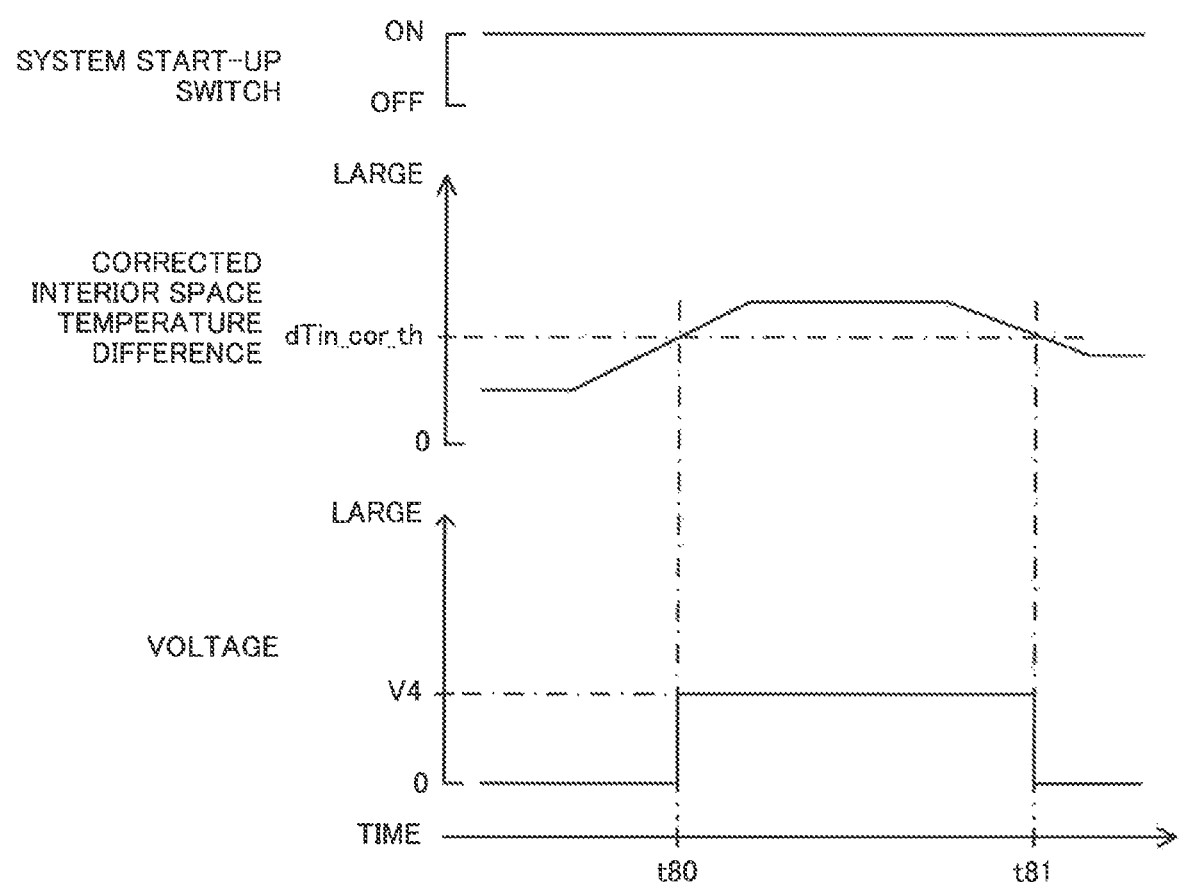
FIG. 8 is a view for showing a time chart used for describing an activation of the control apparatus shown in FIG. 4.

When the control apparatus 90 determines that the anti-fogging heater activation process is requested, the control apparatus 90 executes a post-start-up heater activation control for supplying the electric power having a predetermined constant electric voltage V4, to the heater 23 from the battery 120 for a period that the anti-fogging heater activation process is requested (see the period from the time t80 to the time t81 in FIG. 8).

The predetermined constant electric voltage V4 is an electric voltage capable of preventing the view-angle glass surface 101A from clouding and minimizing an amount of the electric power per unit time supplied to the heater 23 when the electric power having the predetermined constant electric voltage V4, is applied to the heater 23. The predetermined constant electric voltage V4 is acquired on the basis of results of an experiment, etc. and stored in the ROM of the ECU 91. In this embodiment, the predetermined constant electric voltage V4 is lower than the constant electric voltage V1. In this regard, the predetermined constant electric voltage V4 may be equal to the constant electric voltage V1.

The inner surface 20in of the window glass anti-fogging structure 20 may be prevented from clouding by the control apparatus 90 executing the post-start-up heater activation control.

When the corrected interior space temperature difference dTin_cor becomes smaller than the predetermined interior space temperature difference dTin_cor_th (see the time t81 in FIG. 8), the control apparatus 90 determines that the anti-fogging heater activation process is not requested and stops applying the electric power to the heater 23.

The control apparatus 90 may be configured to execute another post-start-up heater activation control for executing an electric voltage application control and an electric voltage application stop control alternately for a period that the anti-fogging heater activation process is requested when the control apparatus 90 determines that the anti-fogging heater activation process is requested. In the electric voltage application control, the control apparatus 90 supplies the electric power having a constant electric voltage V5, to the heater 23 from the battery 120 for a constant application time Tapply_5. In the electric voltage application stop control, the control apparatus 90 stops applying the electric power to the heater 23 from the battery 120 for a constant stop time Tstop. In this case, the constant electric voltage V5, the constant application time Tapply_5, and the constant stop time Tstop are set to a constant electric voltage, a constant application time, and a constant stop time capable of preventing the view-angle glass surface 101A from clouding and minimizing the total amount of the electric power supplied to the heater 23 when the post-start-up heater activation control is executed, respectively. The constant electric voltage V5, the constant application time Tapply_5, and the constant stop time Tstop are acquired on the basis of results of an experiment, etc. and stored in the ROM of the ECU 91.

Further, the control apparatus 90 is configured to determine whether the anti-fogging heater activation process is requested on the basis of the interior space temperature difference dTin, the vehicle speed SPD, and the interior space humidity Hin. In this regard, the control apparatus 90 may be configured to determine whether the anti-fogging heater activation process is requested on the basis of the interior space temperature difference dTin and the vehicle speed SPD. Alternatively, the control apparatus 90 may be configured to determine whether the anti-fogging heater activation process is requested on the basis of the interior space temperature difference dTin and the interior space humidity Hin. Alternatively, the control apparatus 90 may be configured to determine whether the anti-fogging heater activation process is requested on the basis of the interior space temperature difference dTin only.

Further, the control apparatus 90 may be configured to determine whether the anti-fogging heater activation process is requested by using a so-called optical flow technique (i.e., moving vectors of particular points in the images taken by the vehicle-installed camera 11) in addition to the interior space temperature difference dTin, the vehicle speed SPD, and the interior space humidity Hin. In particular, when the front glass outer surface 101out clouds, the image taken by the vehicle-installed camera 11 is unclear. As a result, the control apparatus 90 cannot acquire optical flows. Accordingly, when the control apparatus 90 cannot acquire the optical flows, the control apparatus 90 acquires a value acquired by correcting the interior space temperature difference dTin by a correction coefficient Kopt larger than 1, the correction coefficient Kspd, and the correction coefficient Khin as the corrected interior space temperature difference dTin_cor (=dTin*Kspd*Khin*Kopt). Then, the control apparatus 90 determines that the inner surface 20in of the window glass anti-fogging structure 20 is likely to cloud, and the anti-fogging heater activation process is requested when the corrected interior space temperature difference dTin_cor is equal to or larger than the predetermined interior space temperature difference dTin_cor_th.

<Collision Preventing Control>

The control apparatus 90 is configured to execute a collision preventing control for preventing the vehicle 100 from colliding with an object such as a person and a vehicle in front of the vehicle 100 by using data of the images taken by the vehicle-installed camera 11.

In particular, the control apparatus 90 executes a process of acquiring the object such as a person, a bicycle, and another vehicle existing in front of the vehicle 100 by using the data of the images taken by the vehicle-installed camera 11. When the control apparatus 90 acquires the object, the control apparatus 90 acquires a relative speed SPDrelative of the vehicle 100 with respect to the object and a relative distance Drelative between the object and the vehicle 100. Then, the control apparatus 90 acquires a time TTC taken for the vehicle 100 reaching the object on the basis of the relative speed SPDrelative and the relative distance Drelative. Hereinafter, the time TTC will be referred to as "the reaching time TTC".

When the reaching time TTC becomes equal to or shorter than a predetermined reaching time TTCth, the control apparatus 90 executes the collision preventing control for stopping the vehicle 100 before the vehicle 100 reaches the object by controlling the activations of the engine actuators 98 and the brake actuators 99, independently of an operation of an acceleration pedal and an operation of a brake pedal by the driver.

Thereby, the vehicle 100 can be stopped before the vehicle 100 collides the object, for example, when the person moves into the front area with respect to the vehicle 100 from a left or right side of a road, on which the vehicle 100 moves.

<Concrete Operation of Control Apparatus>

Next, a concrete operation of the control apparatus 90 will be described. The CPU of the ECU 91 of the control apparatus 90 is configured or programmed to execute a routine shown by a flowchart in FIG. 9 each time a predetermined time elapses. Therefore, at a predetermined timing, the CPU starts a process from a step 900 in FIG. 9 and then, proceeds with the process to a step 910 to determine whether the outside air temperature Tair is equal to or lower than the predetermined outside air temperature Tair_th.

When the outside air temperature Tair is equal to or lower than the predetermined outside air temperature Tair_th, the CPU determines "Yes" at the step 910 and then, proceeds with the process to a step 920 to determine whether a value of a start-up heater activation control end flag Xstart is "0". The value of the start-up heater activation control end flag Xstart is set to "1" when an execution of the start-up heater activation control is stopped at a step 1060 in FIG. 10 described later. On the other hand, the value of the start-up heater activation control end flag Xstart is set to "0" when the system start-up switch 96 is set at the OFF position.

Figure 10:
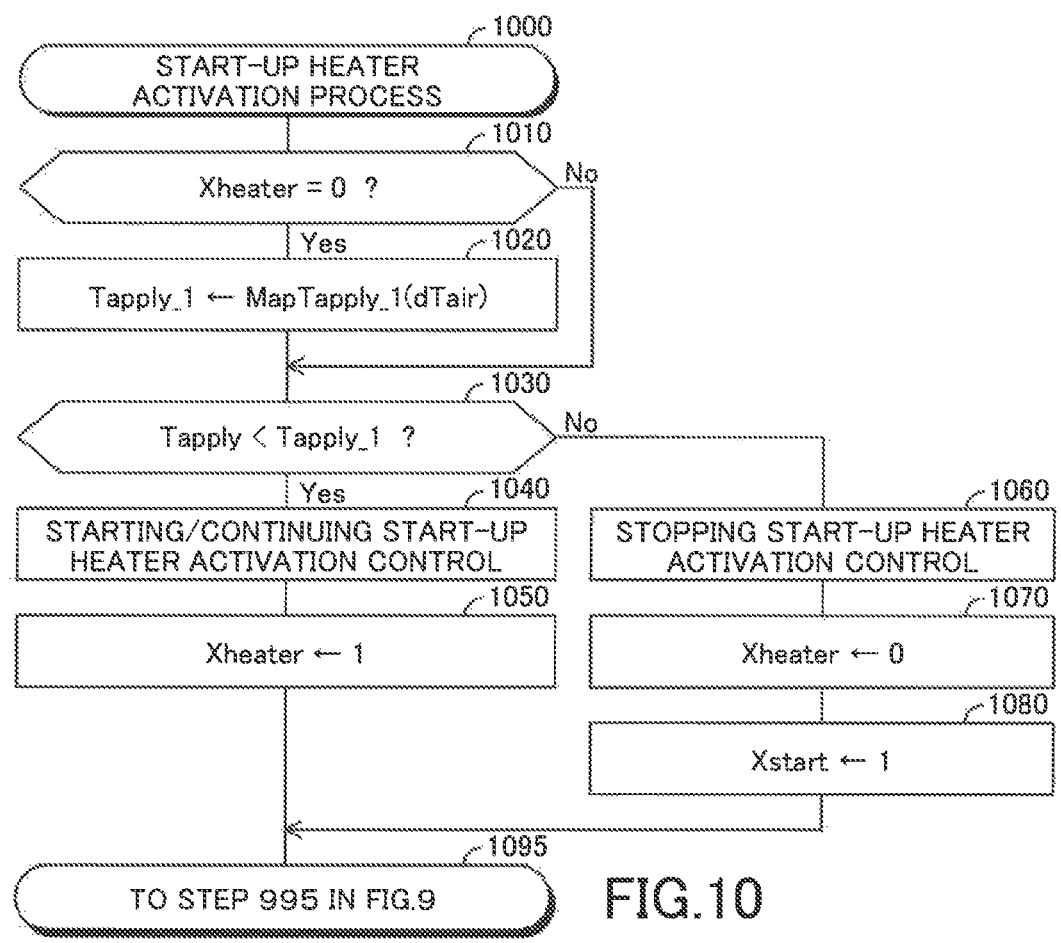
FIG. 10 is a view for showing a flowchart of a routine executed by the control apparatus shown in FIG. 4.

When the value of the start-up heater activation control end flag Xstart is "0", the CPU determines "Yes" at the step 920 and then, proceeds with the process to a step 930 to execute a routine shown by a flowchart in FIG. 10.

Therefore, when the CPU proceeds with the process to the step 930, the CPU starts a process from a step 1000 in FIG. 10 and then, proceeds with the process to a step 1010 to determine whether a value of a heater activation flag Xheater is "0". The value of the heater activation flag Xheater is set to "1" when the execution of the start-up heater activation control is started at a step 1040 in FIG. 10 described later. On the other hand, the value of the heater activation flag Xheater is set to "0" when the execution of the start-up heater activation control is stopped at a step 1060 in FIG. 10 described later.

When the value of the heater activation flag Xheater is "0", the CPU determines "Yes" at the step 1010 and then, executes a process of a step 1020 described below. Then, the CPU proceeds with the process to a step 1030. On the other hand, when the value of the heater activation flag Xheater is "1", the CPU determines "No" at the step 1010 and then, proceeds with the process to the step 1030 directly.

Step 1020: The CPU applies the outside air temperature difference dTair to the look-up table MapTapply_1(dTair) to acquire the predetermined application time Tapply_1.

When the CPU proceeds with the process to the step 1030, the CPU determines whether a time Tapply is shorter than the predetermined application time Tapply_1. The time Tapply is a time elapsing since the execution of the start-up heater activation control is started at a step 1040 described later. Hereinafter, the time Tapply will be referred to as "the elapsing time Tapply".

When the elapsing time Tapply is shorter than the predetermined application time Tapply_1, the CPU determines "Yes" at the step 1030 and then, sequentially executes processes of steps 1040 and 1050 described below. Then, the CPU proceeds with the process to a step 995 in FIG. 9 via a step 1095 to terminate this routine once.

Step 1040: The CPU starts to execute the start-up heater activation control for supplying the electric power having the constant electric voltage V1 to the heater 23 from the battery 120. It should be noted that the CPU continues to execute the start-up heater activation control when the CPU already executes the start-up heater activation control at a time of executing the process of the step 1040.

Step 1050: The CPU sets the value of the heater activation flag Xheater to "1".

On the other hand, when the elapsing time Tapply is equal to or longer than the predetermined application time Tapply_1, the CPU determines "No" at the step 1030 and then, sequentially executes processes of steps 1060 to 1080 described below. Then, the CPU proceeds with the process to the step 995 in FIG. 9 via the step 1095 to terminate this routine once.

Step 1060: The CPU stops executing the start-up heater activation control.

Step 1070: The CPU sets the value of the heater activation flag Xheater to "0".

Step 1080: The CPU sets the value of the start-up heater activation control end flag Xstart to "1".

Figure 9:
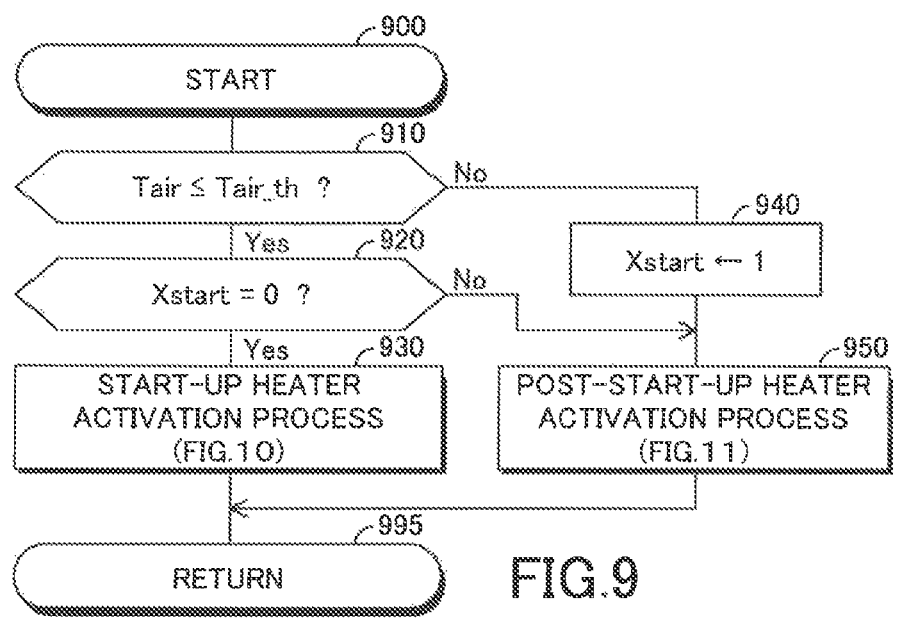
FIG. 9 is a view for showing a flowchart of a routine executed by the control apparatus shown in FIG. 4.

When the outside air temperature Tair is higher than the predetermined outside air temperature Tair_th at a time of executing a process of the step 910 in FIG. 9, the CPU determines "No" at the step 910 and then, executes a process of a step 940 described below. Then, the CPU proceeds with the process to a step 950.

Step 940: The CPU sets the value of the start-up heater activation control end flag Xstart to "1".

Further, when the value of the start-up heater activation control end flag Xstart is "1" at a time of executing a process of the step 920, the CPU determines "No" at the step 920 and then, proceeds with the process to the step 950.

When the CPU proceeds with the process to the step 950, the CPU executes a routine shown by a flowchart in FIG. 11. Therefore, when the CPU proceeds with the process to the step 950, the CPU starts a process from a step 1100 in FIG. 11 and then, sequentially executes processes of steps 1110 to 1140 described below. Then, the CPU proceeds with the process to a step 1150.

Step 1110: The CPU applies the vehicle speed SPD to a look-up table MapKspd(SPD) to acquire the correction coefficient Kspd. The correction coefficient Kspd acquired from the look-up table MapKspd(SPD) increases as the vehicle speed SPD increases.

Step 1120: The CPU applies the interior space humidity Hin to a look-up table MapKhin(Hin) to acquire the correction coefficient Khin. The correction coefficient Khin acquired from the look-up table MapKhin(Hin) increases as the interior space humidity Hin increases.

Step 1130: The CPU subtracts the outside air temperature Tair from the interior space temperature Tin to acquire the interior space temperature difference dTin (=Tin−Tair).

Step 1140: The CPU multiplies the interior space temperature difference dTin by the correction coefficient Kspd and the correction coefficient Khin to acquire the corrected interior space temperature difference dTin_cor (=dTin*Kspd*Khin).

When the CPU proceeds with the process to the step 1150, the CPU determines whether the corrected interior space temperature difference dTin_cor is equal to or larger than the predetermined interior space temperature difference dTin_cor_th. When the corrected interior space temperature difference dTin_cor is equal to or larger than the predetermined interior space temperature difference dTin_cor_th, the CPU determines "Yes" at the step 1150 and then, executes a process of a step 1160 described below. Then, the CPU proceeds with the process to the step 995 in FIG. 9 via a step 1195 to terminate this routine once.

Step 1160: The CPU starts to execute the post-start-up heater activation control for supplying the electric power having the predetermined constant electric voltage V4 to the heater 23 from the battery 120. It should be noted that the CPU continues to execute the post-start-up heater activation control when the CPU already executes the post-start-up heater activation control at a time of executing the process of the step 1160.

On the other hand, when the corrected interior space temperature difference dTin_cor is smaller than the predetermined interior space temperature difference dTin_cor_th, the CPU determines "No" at the step 1150 and then, executes a process of a step 1170 described below. Then, the CPU proceeds with the process to the step 995 in FIG. 9 via the step 1195 to terminate this routine once.

Step 1170: The CPU stops executing the post-start-up heater activation control.

The concrete operation of the control apparatus 90 has been described. When the inner surface 20in of the window glass anti-fogging structure 20 may cloud, the control apparatus 90 supplies the electric power to the heater 23. Thereby, the inner surface 20in of the window glass anti-fogging structure 20 can be prevented from clouding.

It should be noted that the present disclosure is not limited to the aforementioned embodiment and various modifications can be employed within the scope of the present disclosure.

Figure 12A:
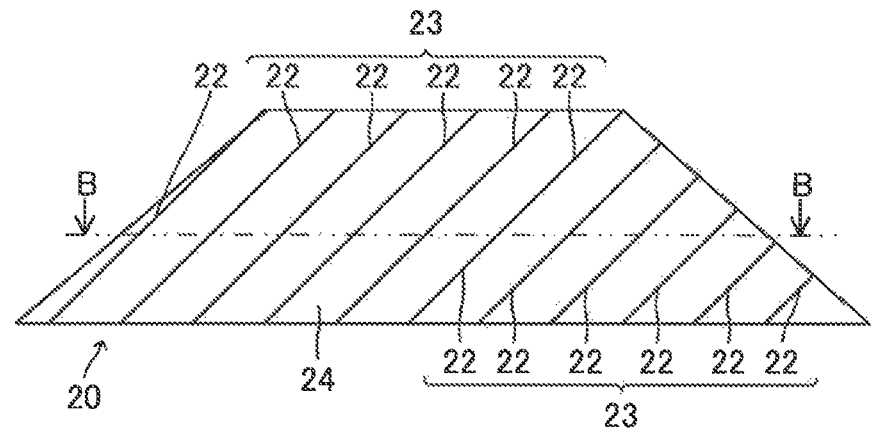
FIG. 12A is a view for showing a window glass anti-fogging structure according to a first modified example of the embodiment of the present disclosure.
Figure 12B:
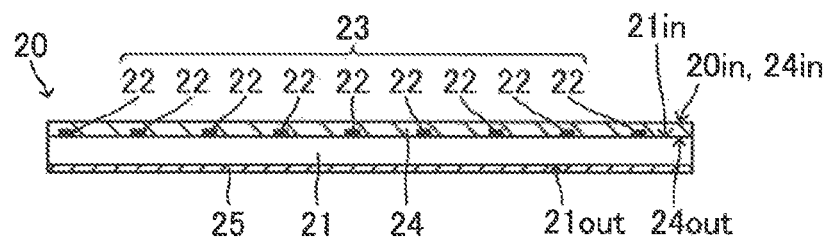
FIG. 12B is a sectional view for showing the window glass anti-fogging structure according to the first modified example along a line B-B of FIG. 12A.
Figure 12C:
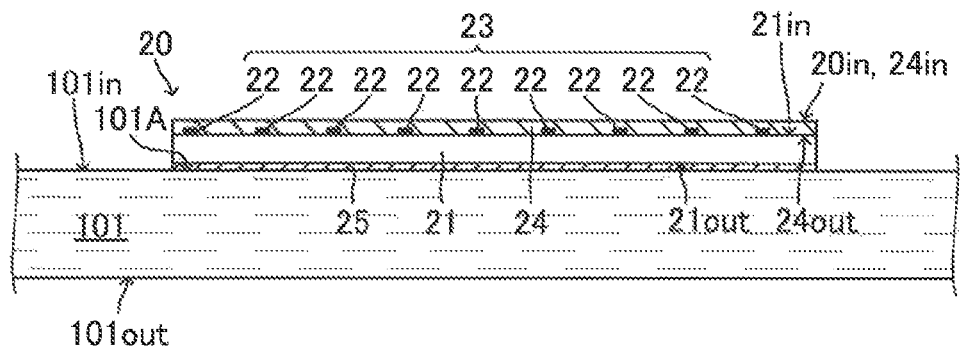
FIG. 12C is a sectional view for showing the window glass anti-fogging structure according to the first modified example and the front glass.

For example, the window glass anti-fogging structure 20 may be configured as shown in FIG. 12A, FIG. 12B, and FIG. 12C. The heater 23 of the window glass anti-fogging structure 20 shown in FIG. 12A, FIG. 12B, and FIG. 12C according to a first modified example of the embodiment of the present disclosure, is formed of electric heating wires 22 provided on the inner surface 21in of the transparent substrate layer 21, spacing apart from each other at a constant distance. The anti-fogging membrane 24 according to the first modified example is provided on the inner surface 21in of the transparent substrate layer 21 such that the anti-fogging membrane 24 covers the inner surface 21in and the electric heating wires 22 entirely. The transparent substrate layer 21 according to the first modified example is attached to the view-angle glass surface 101A by the adhesive layer 25 provided on the outer surface 21out of the transparent substrate layer 21.

Figure 13A:
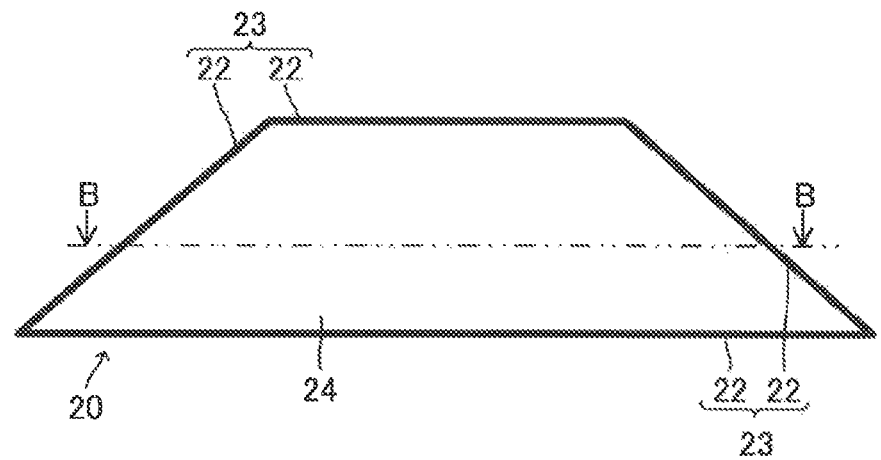
FIG. 13A is a view for showing a window glass anti-fogging structure according to a second modified example of the embodiment of the present disclosure.
Figure 13B:
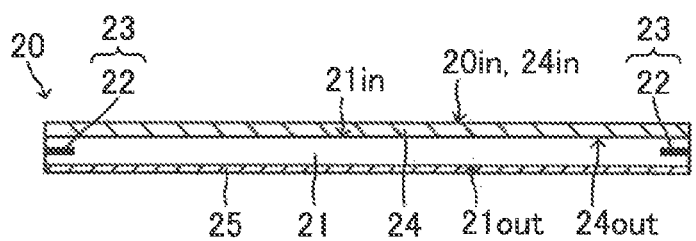
FIG. 13B is a sectional view for showing the window glass anti-fogging structure according to the second modified example along a line B-B of FIG. 13A.
Figure 13C:
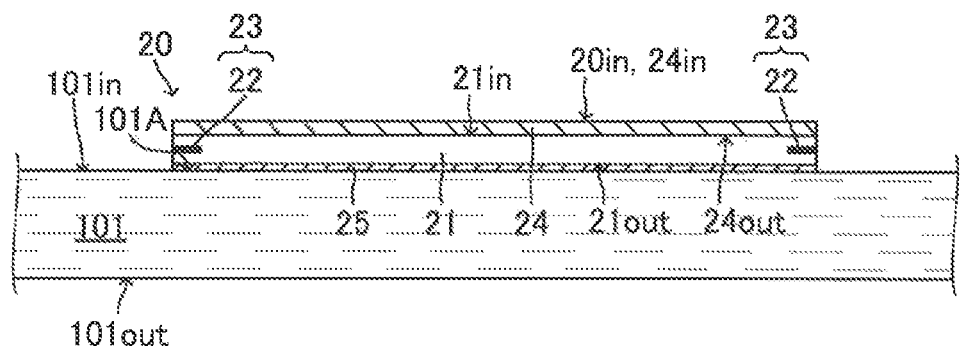
FIG. 13C is a sectional view for showing the window glass anti-fogging structure according to the second modified example and the front glass.

Further, the window glass anti-fogging structure 20 may be configured as shown in FIG. 13A, FIG. 13B, and FIG. 13C. The heater 23 of the window glass anti-fogging structure 20 shown in FIG. 13A, FIG. 13B, and FIG. 13C according to a second modified example of the embodiment of the present disclosure, is formed of a single electric heating wire 22 having an annular shape embedded in the transparent substrate layer 21 such that the electric heating wire 22 is provided along an entire outer peripheral area of the transparent substrate layer 21. The anti-fogging membrane 24 according to the second modified example is provided on the inner surface 21in of the transparent substrate layer 21 such that the anti-fogging membrane 24 covers the inner surface 21in entirely. The transparent substrate layer 21 according to the second modified example is attached to the view-angle glass surface 101A by the adhesive layer 25 provided on the outer surface 21out of the transparent substrate layer 21.

Figure 14A:
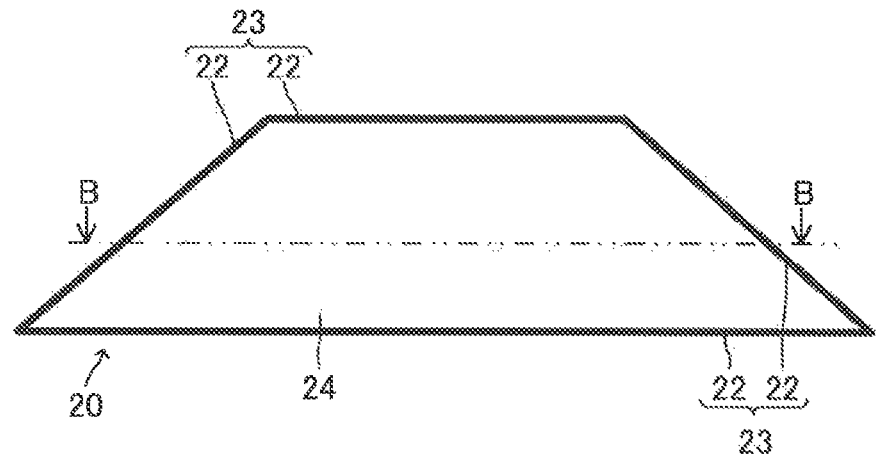
FIG. 14A is a view for showing a window glass anti-fogging structure according to a third modified example of the embodiment of the present disclosure.
Figure 14B:
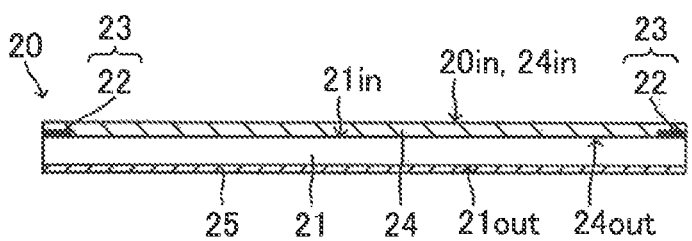
FIG. 14B is a sectional view for showing the window glass anti-fogging structure according to the third modified example along a line B-B of FIG. 14A.
Figure 14C:
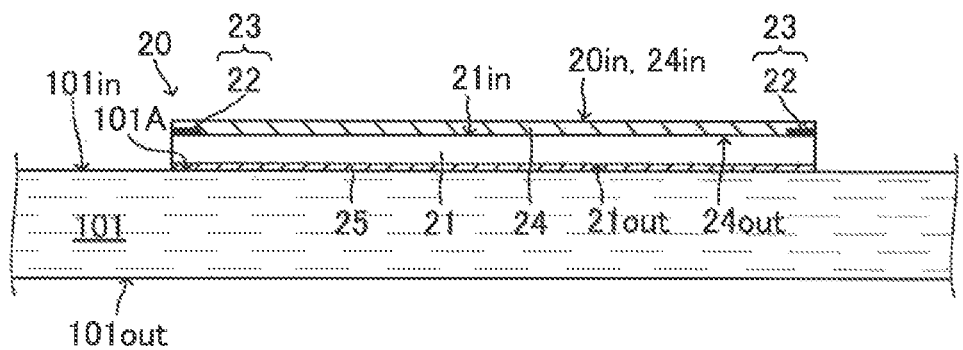
FIG. 14C is a sectional view for showing the window glass anti-fogging structure according to the third modified example and the front glass.

Further, the window glass anti-fogging structure 20 may be configured as shown in FIG. 14A, FIG. 14B, and FIG. 14C. The heater 23 of the window glass anti-fogging structure 20 shown in FIG. 14A, FIG. 14B, and FIG. 14C according to a third modified example of the embodiment of the present disclosure, is formed of a single electric heating wire 22 having an annular shape provided on the inner surface 21in of the transparent substrate layer 21 such that the electric heating wire 22 is provided along an entire outer peripheral area of the transparent substrate layer 21. The anti-fogging membrane 24 according to the third modified example is provided on the inner surface 21in of the transparent substrate layer 21 such that the anti-fogging membrane 24 covers the inner surface 21in entirely. The transparent substrate layer 21 according to the third modified example is attached to the view-angle glass surface 101A by the adhesive layer 25 provided on the outer surface 21out of the transparent substrate layer 21.

Figure 15A:
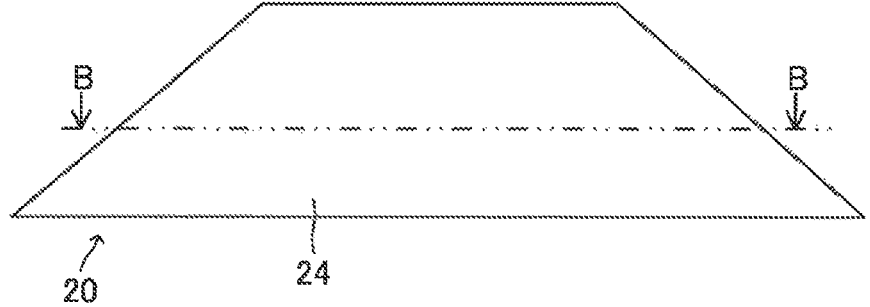
FIG. 15A is a view for showing a part of a window glass anti-fogging structure according to a fourth modified example of the embodiment of the present disclosure.
Figure 15B:
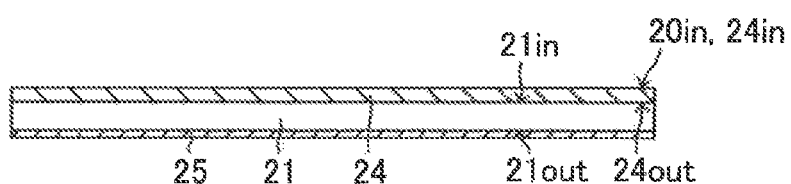
FIG. 15B is a sectional view for showing the part of the window glass anti-fogging structure according to the fourth modified example along a line B-B of FIG. 15A.
Figure 15C:
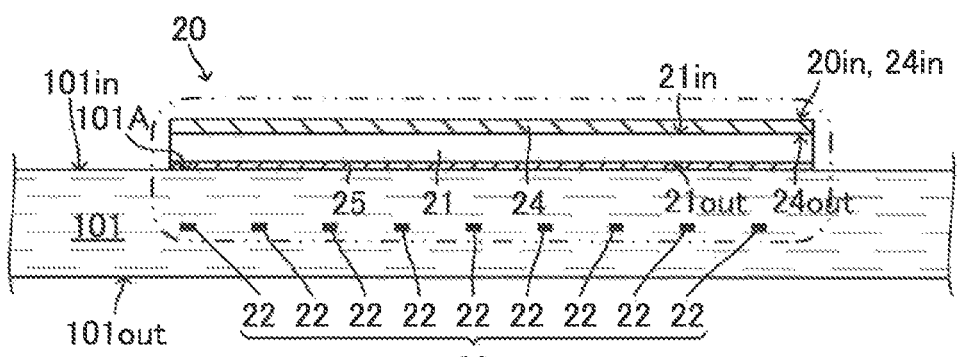
FIG. 15C is a sectional view for showing the window glass anti-fogging structure according to the fourth modified example and the front glass.

Further, the window glass anti-fogging structure 20 may be configured as shown in FIG. 15A, FIG. 15B, and FIG. 15C. The heater 23 of the window glass anti-fogging structure 20 shown in FIG. 15A, FIG. 15B, and FIG. 15C according to a fourth modified example of the embodiment of the present disclosure, is formed of electric heating wires 22 embedded in a part of the front glass 101 corresponding to the view-angle glass surface 101A, spacing apart from each other at a constant distance. The anti-fogging membrane 24 according to the fourth modified example is provided on the inner surface 21in of the transparent substrate layer 21 such that the anti-fogging membrane 24 covers the inner surface 21in entirely. The transparent substrate layer 21 according to the fourth modified example is attached to the view-angle glass surface 101A by the adhesive layer 25 provided on the outer surface 21out of the transparent substrate layer 21.

Figure 16A:
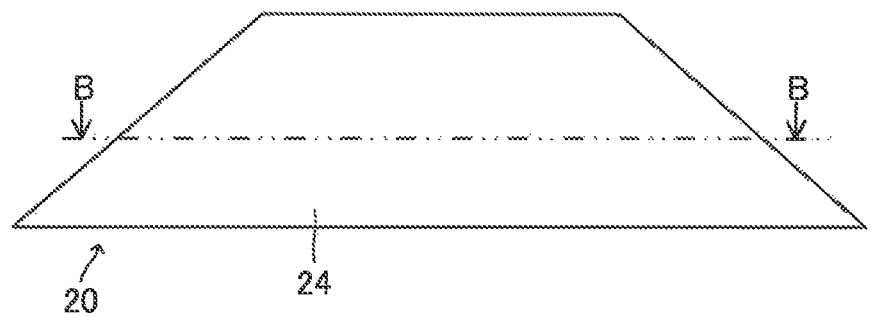
FIG. 16A is a view for showing a part of a window glass anti-fogging structure according to a fifth modified example of the embodiment of the present disclosure.
Figure 16B:
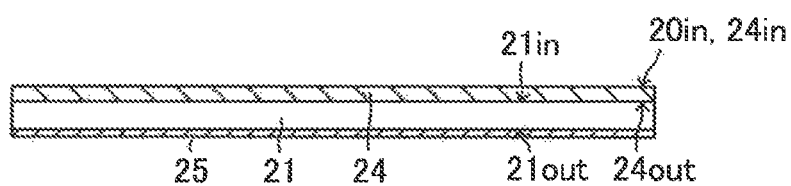
FIG. 16B is a sectional view for showing the part of the window glass anti-fogging structure according to the fifth modified example along a line B-B of FIG. 16A.
Figure 16C:
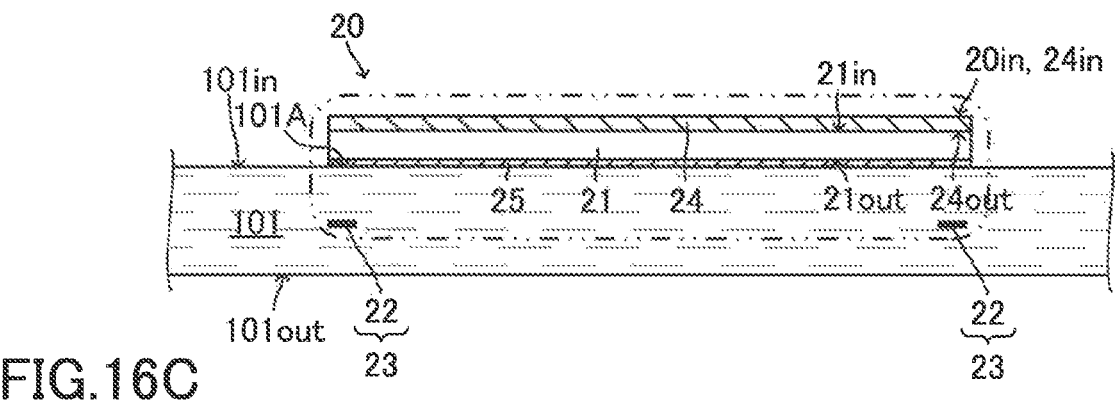
FIG. 16C is a sectional view for showing the window glass anti-fogging structure according to the fifth modified example and the front glass.

Further, the window glass anti-fogging structure 20 may be configured as shown in FIG. 16A, FIG. 16B, and FIG. 16C. The heater 23 of the window glass anti-fogging structure 20 shown in FIG. 16A, FIG. 16B, and FIG. 16C according to a fifth modified example of the embodiment of the present disclosure, is formed of a single electric heating wire 22 having an annular shape embedded in a part of the front glass 101 corresponding to the view-angle glass surface 101A such that the electric heating wire 22 is provided along an entire outer peripheral area of the portion of the front glass 101 corresponding to the view-angle glass surface 101A. The anti-fogging membrane 24 according to the fifth modified example is provided on the inner surface 21in of the transparent substrate layer 21 such that the anti-fogging membrane 24 covers the inner surface 21in entirely. The transparent substrate layer 21 according to the fifth modified example is attached to the view-angle glass surface 101A by the adhesive layer 25 provided on the outer surface 21out of the transparent substrate layer 21.

Figure 17A:
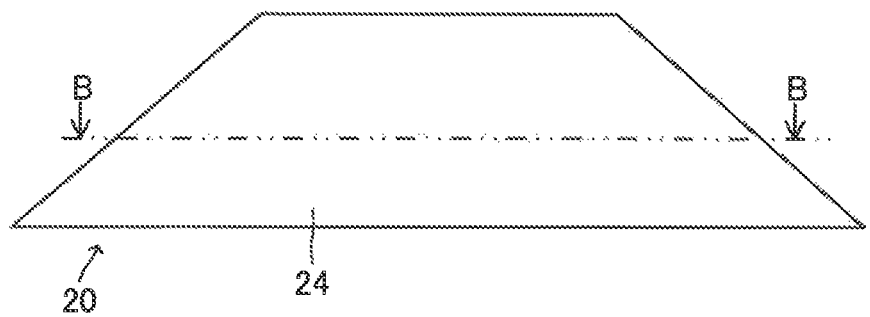
FIG. 17A is a view for showing a part of a window glass anti-fogging structure according to a sixth modified example of the embodiment of the present disclosure.
Figure 17B:
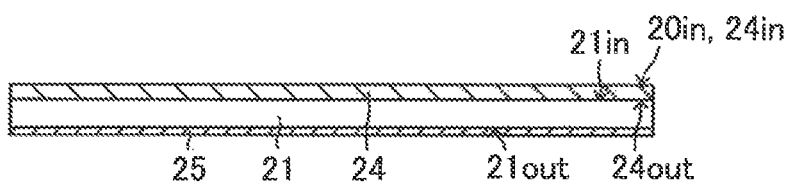
FIG. 17B is a sectional view for showing the part of the window glass anti-fogging structure according to the sixth modified example along a line B-B of FIG. 17A.
Figure 17C:
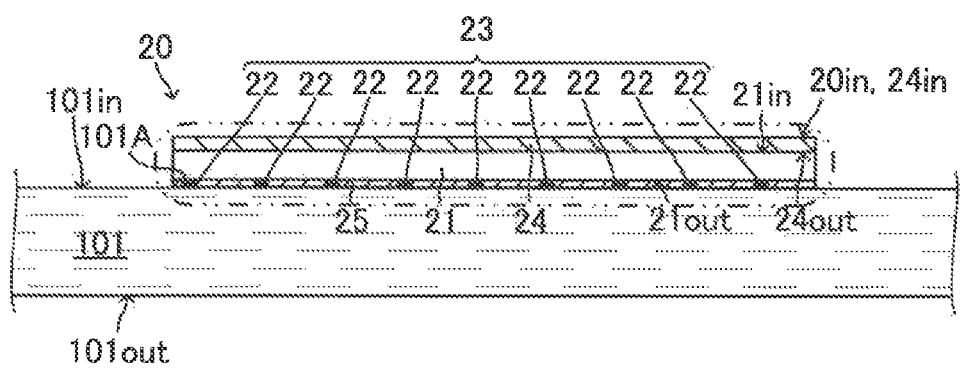
FIG. 17C is a sectional view for showing the window glass anti-fogging structure according to the sixth modified example and the front glass.

Further, the window glass anti-fogging structure 20 may be configured as shown in FIG. 17A, FIG. 17B, and FIG. 17C. The heater 23 of the window glass anti-fogging structure 20 shown in FIG. 17A, FIG. 17B, and FIG. 17C according to a sixth modified example of the embodiment of the present disclosure, is formed of electric heating wires 22 provided on the view-angle glass surface 101A, spacing apart from each other at a constant distance. The anti-fogging membrane 24 according to the sixth modified example is provided on the inner surface 21in of the transparent substrate layer 21 such that the anti-fogging membrane 24 covers the inner surface 21in entirely. The transparent substrate layer 21 according to the sixth modified example is attached to the view-angle glass surface 101A by the adhesive layer 25 provided on the outer surface 21out of the transparent substrate layer 21 such that the transparent substrate layer 21 covers the electric heating wires 22 entirely.

Figure 18A:
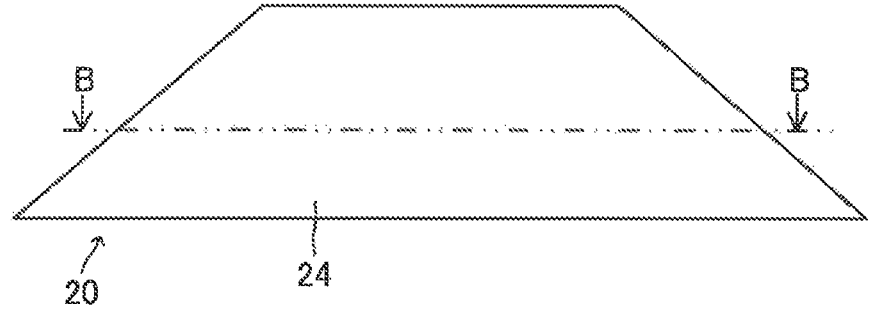
FIG. 18A is a view for showing a part of a window glass anti-fogging structure according to a seventh modified example of the embodiment of the present disclosure.
Figure 18B:
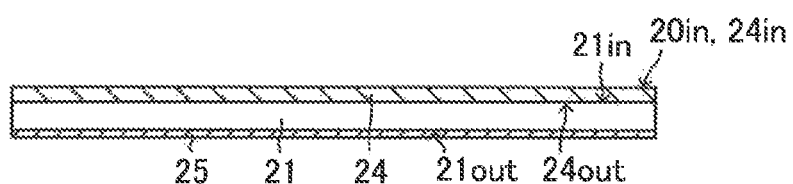
FIG. 18B is a sectional view for showing the part of the window glass anti-fogging structure according to the seventh modified example along a line B-B of FIG. 18A.
Figure 18C:
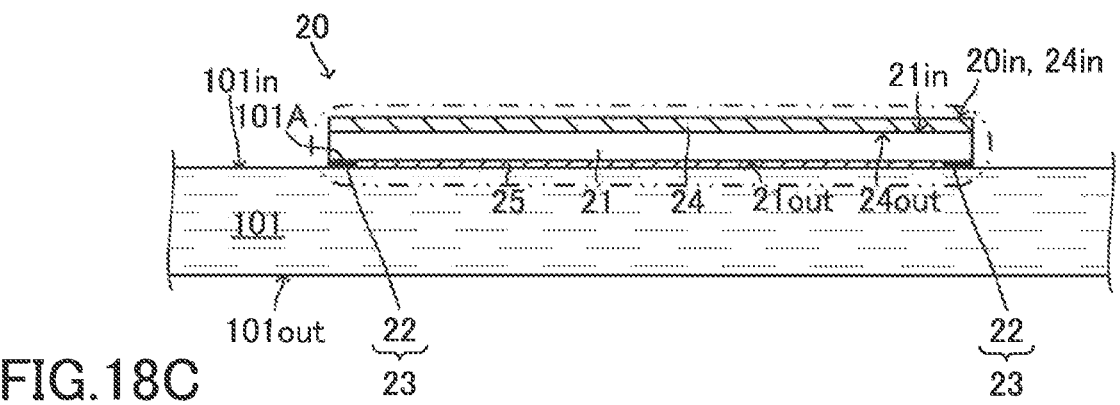
FIG. 18C is a sectional view for showing the window glass anti-fogging structure according to the seventh modified example and the front glass.

Further, the window glass anti-fogging structure 20 may be configured as shown in FIG. 18A, FIG. 18B, and FIG. 18C. The heater 23 of the window glass anti-fogging structure 20 shown in FIG. 18A, FIG. 18B, and FIG. 18C according to a seventh modified example of the embodiment of the present disclosure, is formed of a single electric heating wire 22 having an annular shape provided on the view-angle glass surface 101A such that the electric heating wire 22 is provided along the entire outer peripheral area of the view-angle glass surface 101A. The anti-fogging membrane 24 according to the seventh modified example is provided on the inner surface 21in of the transparent substrate layer 21 such that the anti-fogging membrane 24 covers the inner surface 21in entirely. The transparent substrate layer 21 according to the seventh modified example is attached to the view-angle glass surface 101A by the adhesive layer 25 provided on the outer surface 21out of the transparent substrate layer 21 such that the transparent substrate layer 21 covers the electric heating wire 22 entirely.

Further, the anti-fogging membrane 24 may be provided on the view-angle glass surface 101A by attaching the anti-fogging membrane 24 having a sheet-like shape, to the view-angle glass surface 101A. Alternatively, the anti-fogging membrane 24 may be provided on the view-angle glass surface 101A by applying material having the anti-fogging property to the view-angle glass surface 101A, etc.

What is claimed is:

1. A window glass anti-fogging structure provided on an inner surface of a window glass of a vehicle for preventing the inner surface of the window glass from clouding, the inner surface of the window glass being a surface of the window glass on the side of a vehicle interior space,
wherein the window glass anti-fogging structure is provided on a view-angle glass surface of the window glass such that the window glass anti-fogging structure covers the view-angle glass surface,
the view-angle glass surface is a part of the inner surface of the window glass within a range of an angle of view of a vehicle-installed camera provided in the vehicle interior space for taking images of a view outside of the vehicle through the view-angle glass surface,
the window glass anti-fogging structure includes an anti-fogging membrane having an anti-fogging property and a heater for generating heat,
the anti-fogging membrane includes an inner surface and an outer surface, the inner surface of the anti-fogging membrane being a surface of the anti-fogging membrane on the side of the vehicle interior space in a condition that the window glass anti-fogging structure is provided on the view-angle glass surface, and the outer surface of the anti-fogging membrane being a surface of the anti-fogging membrane on the opposite side of the inner surface of the anti-fogging membrane,
the inner surface of the anti-fogging membrane exposes the vehicle interior space on the condition that the window glass anti-fogging structure is provided on the view-angle glass surface,
the heater includes at least one electric heating wire which generates the heat when electric power is supplied to the at least one electric heating wire; and
an electronic control unit configured to:
calculate a difference between a temperature of an outside air and a temperature of an air in a vehicle interior space of the vehicle,
correct the difference using a correction coefficient, the correction coefficient increases as a speed of the vehicle increases,
determine that the inner surface of the anti-fogging membrane clouds when the corrected difference is equal to or larger than a predetermined value, and
in response to determining that the inner surface of the anti-fogging membrane clouds, supply electric power to the at least one electric heating wire.

2. The window glass anti-fogging structure as set forth in claim 1,
wherein the window glass anti-fogging structure further includes a transparent substrate layer having a stiffness property,
the transparent substrate layer includes an inner surface and an outer surface, the inner surface of the transparent substrate layer being a surface of the transparent substrate layer on the side of the vehicle interior space in the condition that the window glass anti-fogging structure is provided on the view-angle glass surface, and the outer surface of the transparent substrate layer being a surface of the transparent substrate layer on the opposite side of the inner surface of the transparent substrate layer, and
the anti-fogging membrane is provided on the transparent substrate layer such that the outer surface of the anti-fogging membrane is in contact with the inner surface of the transparent substrate layer.

3. The window glass anti-fogging structure as set forth in claim 2, wherein the at least one electric heating wire is embedded in the transparent substrate layer.

4. The window glass anti-fogging structure as set forth in claim 2,
wherein the at least one electric heating wire is provided on the inner surface of the transparent substrate layer, and
the anti-fogging membrane is provided on the transparent substrate layer such that the anti-fogging membrane covers the at least one electric heating wire and the inner surface of the transparent substrate layer.

5. The window glass anti-fogging structure as set forth in claim 1, wherein the anti-fogging membrane has a water absorbing property as the anti-fogging property.

6. The window glass anti-fogging structure as set forth in the claim 1, wherein the anti-fogging membrane has a hydrophilic property as the anti-fogging property.

7. An electric power supply control apparatus for controlling a supply of the electric power to the at least one electric heating wire of the window glass anti-fogging structure as set forth in claim 1,
wherein the electric power supply control apparatus includes an electronic control unit configured to:
start to supply the electric power to the at least electric heating wire when a switch for transferring a state of the vehicle to a moving ready state, is set at a position for transferring the state of the vehicle to the moving ready state, and a temperature of an outside air is equal to or lower than a predetermined outside air temperature;
continue to supply the electric power to the at least electric heating wire until a predetermined time elapses after the electronic control unit starts to supply the electric power to the at least electric heating wire; and
stop supplying the electric power to the at least one electric heating wire when the predetermined time elapses.

8. The electronic power supply control apparatus as set forth in claim 1, wherein the electronic control unit is configured to use the difference between the temperature of an outside air and the temperature of the air in the vehicle interior space of the vehicle, the speed of the vehicle, and a humidity of the air in the vehicle interior space for estimating that the inner surface of the anti-fogging membrane clouds.

9. The electric power supply control apparatus as set forth in claim 1, wherein the electronic control unit is configured to use the difference between the temperature of an outside air and the temperature of the air in the vehicle interior space of the vehicle, and a humidity of the air in the vehicle interior space for estimating that the inner surface of the anti-fogging membrane clouds.

10. A vehicle-installed camera apparatus provided in a vehicle interior space of a vehicle for taking images of a view outside of the vehicle through a window glass of the vehicle,
wherein the vehicle-installed camera apparatus includes a vehicle-installed camera for taking the images of the vehicle outside of the vehicle through the window glass of the vehicle and a window glass anti-fogging structure provided on a view-angle glass surface of the window glass of the vehicle for preventing the view-angle glass surface from clouding, the view-angle glass surface being a part of the window glass within a range of an angle of view of the vehicle-installed camera, the anti-fogging membrane includes an inner surface and an outer surface, the inner surface of the anti-fogging membrane being a surface of the anti-fogging membrane on the side of the vehicle interior space in a condition that the window glass anti-fogging structure is provided on the view-angle glass surface, and the outer surface of the anti-fogging membrane being a surface of the anti-fogging membrane on the opposite side of the inner surface of the anti-fogging membrane, the inner surface of the anti-fogging membrane exposes to the vehicle interior space on the condition that the window glass anti-fogging structure is provided on the view-angle glass surface, the heater includes at least one electric heating wire which generates the heat when electric power is supplied to the at least one electric heating wire, an electronic control unit configured to:
- calculate a difference between a temperature of an outside air and a temperature of an air in a vehicle interior space of the vehicle,
- correct the difference using a correction coefficient, the correction coefficient increases as a speed of the vehicle increases,
- determine that the inner surface of the anti-fogging membrane clouds when the corrected difference is equal to or larger than a predetermined value, and
- in response to determining that the inner surface of the anti-fogging membrane clouds, supply electric power to the at least one electric heating wire.

* * * * *